(12) United States Patent
Chamberlin et al.

(10) Patent No.: US 10,069,375 B2
(45) Date of Patent: Sep. 4, 2018

(54) ELECTRIC MACHINE MODULE COOLING SYSTEM AND METHOD

(75) Inventors: Bradley D. Chamberlin, Pendleton, IN (US); James J. Ramey, Fortville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 672 days.

(21) Appl. No.: 13/462,419

(22) Filed: May 2, 2012

(65) Prior Publication Data
US 2013/0293040 A1 Nov. 7, 2013

(51) Int. Cl.
H02K 9/00 (2006.01)
H02K 5/20 (2006.01)
H02K 9/19 (2006.01)

(52) U.S. Cl.
CPC .......... *H02K 5/20* (2013.01); *H02K 9/19* (2013.01); *Y10T 29/49009* (2015.01)

(58) Field of Classification Search
USPC .......................................... 310/54, 260, 270
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,184,624 A * | 5/1965 | Solomon | 310/54 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 5,081,382 A | 1/1992 | Collings et al. | |
| 5,180,004 A | 1/1993 | Nguyen | |
| 5,207,121 A | 5/1993 | Blen | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Naishadh Desai
(74) *Attorney, Agent, or Firm* — Cantor Colburn LLP

(57) ABSTRACT

Embodiments of the invention provide an electric machine module. The module can include a housing that can define a machine cavity. The housing can include a sleeve member that can include a first axial sleeve member comprising a first flange, a second flange, and first recess at least partially defined between the first flange and the second flange. The sleeve member can also include a second axial sleeve member comprising a third flange, a fourth flange, and a second recess at least partially defined between the first flange and the second flange. The first axial sleeve member can be coupled to the second axial sleeve member to form the sleeve member and so that the first recess and the second recess form a coolant jacket. An electric machine can be positioned within the machine cavity so that it is substantially circumscribed by a portion of the coolant jacket.

15 Claims, 32 Drawing Sheets

(56) References Cited

U.S. PATENT DOCUMENTS

| | | | |
|---|---|---|---|
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,859,482 A | 1/1999 | Crowell et al. | |
| 5,923,108 A * | 7/1999 | Matake et al. | 310/89 |
| 5,937,817 A | 8/1999 | Schanz et al. | |
| 5,939,808 A * | 8/1999 | Adames | 310/89 |
| 5,965,965 A | 12/1999 | Umeda et al. | |
| 6,011,332 A | 1/2000 | Umeda et al. | |
| 6,069,424 A | 5/2000 | Colello et al. | |
| 6,075,304 A | 6/2000 | Ginzoh Nakatuska | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,300,693 B1 * | 10/2001 | Poag et al. | 310/54 |
| 6,313,559 B1 | 11/2001 | Kusase et al. | |
| 6,333,537 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Measegi | |
| 6,559,572 B2 | 5/2003 | Nakamura | |
| 6,579,202 B2 | 6/2003 | El-Antably et al. | |
| 6,700,236 B2 * | 3/2004 | Umeda et al. | 310/54 |
| 6,770,999 B2 | 8/2004 | Sakuraki | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,102,267 B2 * | 9/2006 | Gromoll | H02K 9/20 310/260 |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 8,269,383 B2 * | 9/2012 | Bradfield | 310/58 |
| 8,803,380 B2 * | 8/2014 | Chamberlin | H02K 5/20 310/54 |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0274450 A1 | 12/2005 | Smith et al. | |
| 2005/0285456 A1 | 12/2005 | Amagi et al. | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0210655 A1 * | 9/2007 | Bahr et al. | 310/54 |
| 2007/0216236 A1 | 9/2007 | Ward | |
| 2007/0278869 A1 * | 12/2007 | Taketsuna | H02K 9/19 310/54 |
| 2008/0024020 A1 * | 1/2008 | Lund et al. | 310/61 |
| 2008/0223557 A1 * | 9/2008 | Fulton | H02K 5/20 165/104.33 |
| 2009/0102298 A1 * | 4/2009 | Savant | H02K 5/20 310/52 |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2010/0264760 A1 * | 10/2010 | Matsui | H02K 3/24 310/54 |
| 2011/0050141 A1 | 3/2011 | Yeh et al. | |
| 2011/0101700 A1 | 5/2011 | Stiesdal | |
| 2011/0109095 A1 | 5/2011 | Stiesdal | |
| 2011/0273039 A1 * | 11/2011 | Chamberlin | H02K 5/20 310/59 |
| 2011/0273040 A1 * | 11/2011 | Chamberlin | H02K 1/32 310/59 |
| 2011/0298315 A1 * | 12/2011 | Fulton | H02K 9/19 310/54 |
| 2011/0298316 A1 * | 12/2011 | Bradfield | H02K 9/19 310/58 |
| 2011/0298317 A1 * | 12/2011 | Bradfield | H02K 9/19 310/58 |
| 2011/0298318 A1 * | 12/2011 | Bradfield | H02K 5/20 310/58 |
| 2011/0304226 A1 * | 12/2011 | Bradfield | H02K 5/18 310/52 |
| 2011/0304227 A1 * | 12/2011 | Bradfield | H02K 1/20 310/52 |
| 2011/0304228 A1 * | 12/2011 | Bradfield | H02K 1/20 310/54 |
| 2012/0080982 A1 * | 4/2012 | Bradfield | H02K 1/20 310/60 A |
| 2012/0091834 A1 * | 4/2012 | Bradfield | H02K 5/20 310/54 |
| 2012/0262012 A1 * | 10/2012 | Kubes | H02K 5/20 310/54 |
| 2013/0038150 A1 * | 2/2013 | Chamberlin | H02K 3/24 310/59 |
| 2013/0049496 A1 * | 2/2013 | Chamberlin | H02K 3/24 310/54 |
| 2013/0062974 A1 * | 3/2013 | Chamberlin | H02K 5/20 310/59 |
| 2013/0140924 A1 * | 6/2013 | Glubrecht | H02K 1/20 310/59 |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |

(56) References Cited

FOREIGN PATENT DOCUMENTS

| | | |
|---|---|---|
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Nov. 14, 2012 for corresponding Application No. PCT/US2012/040794; 8 sheets.
International Search Report.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

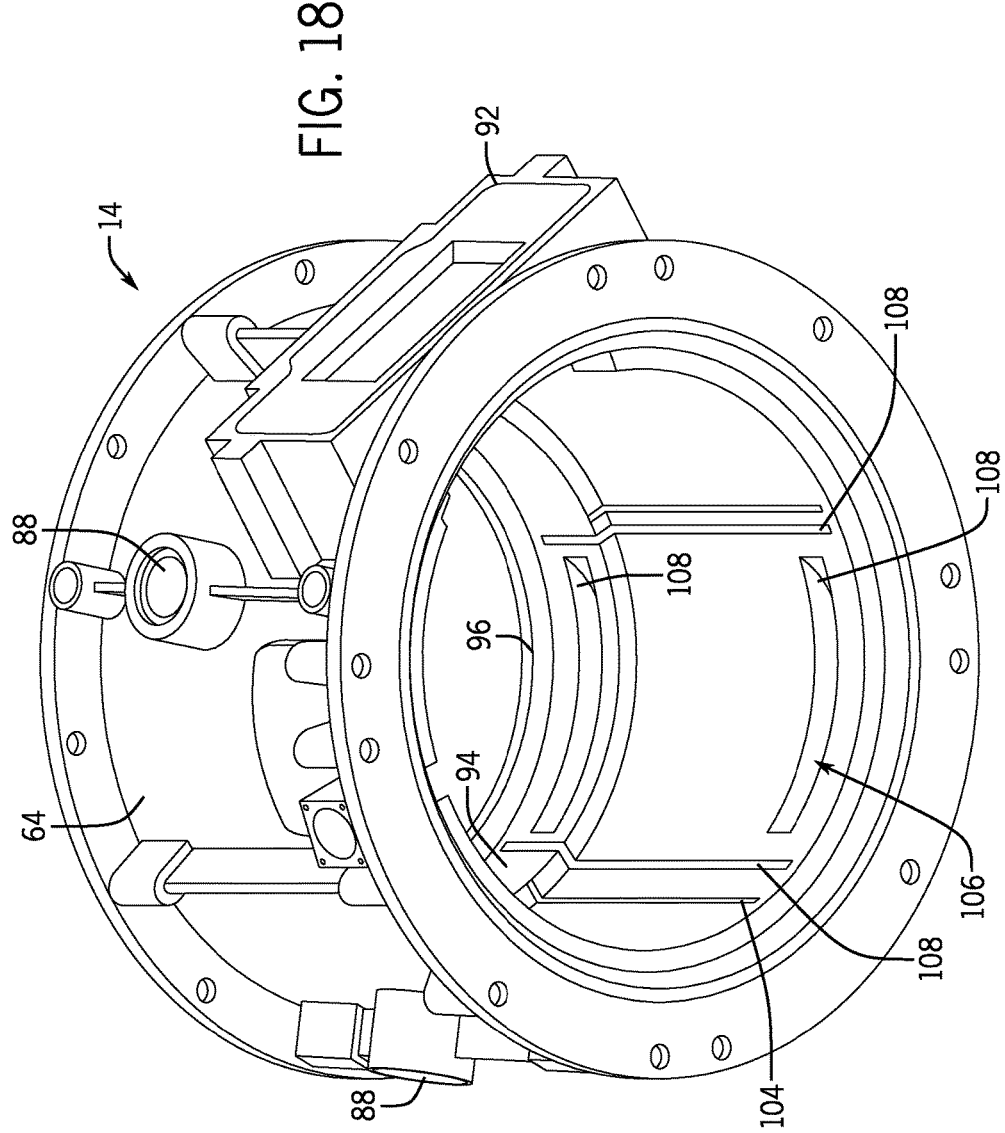

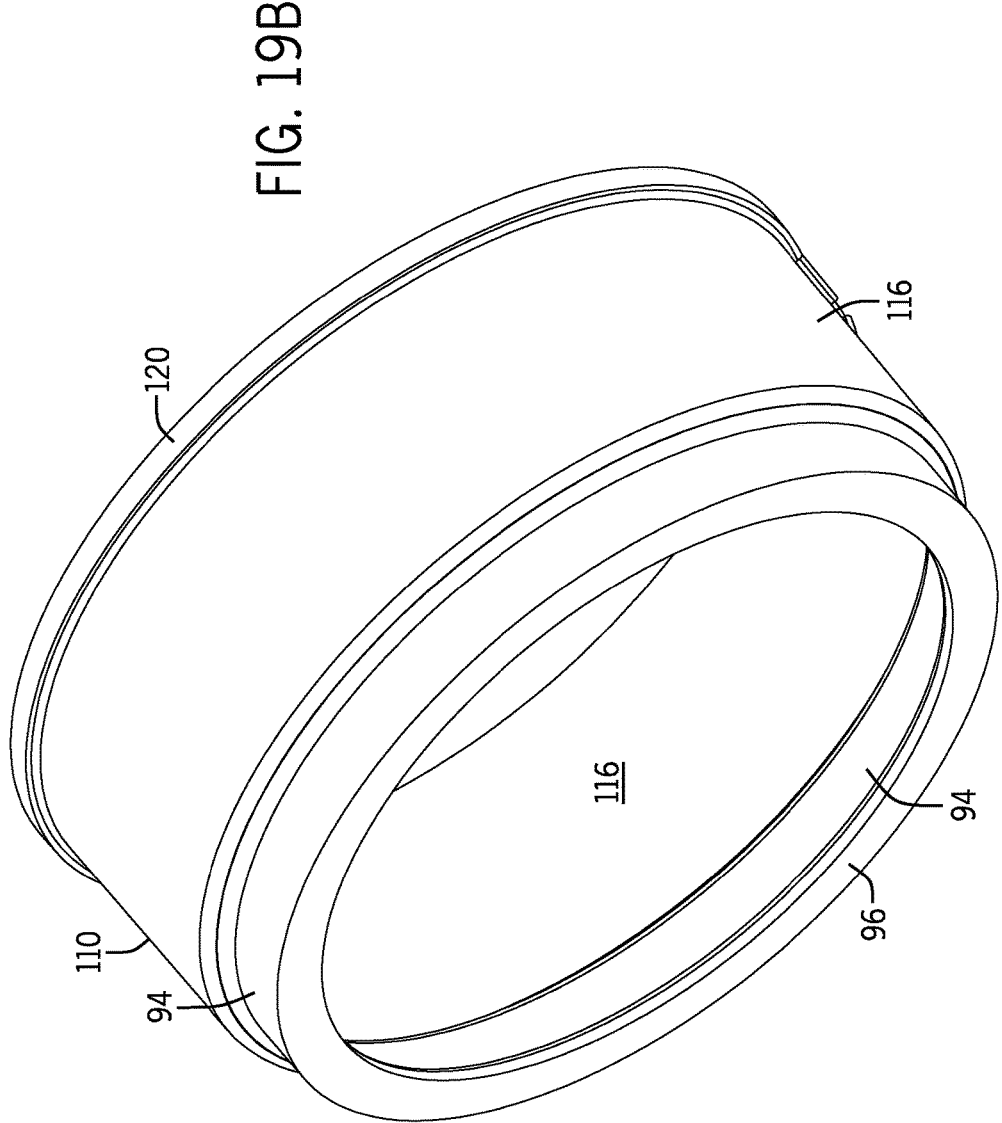

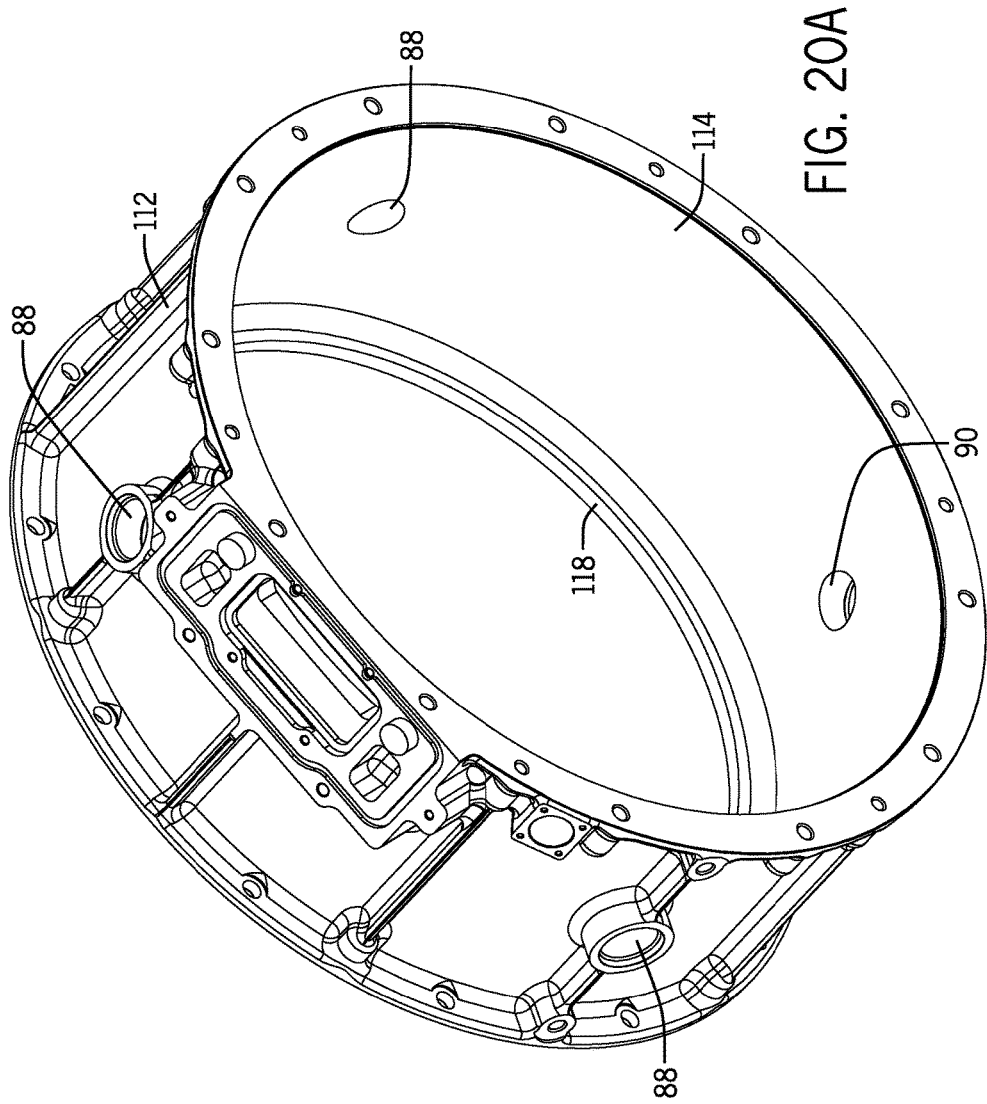

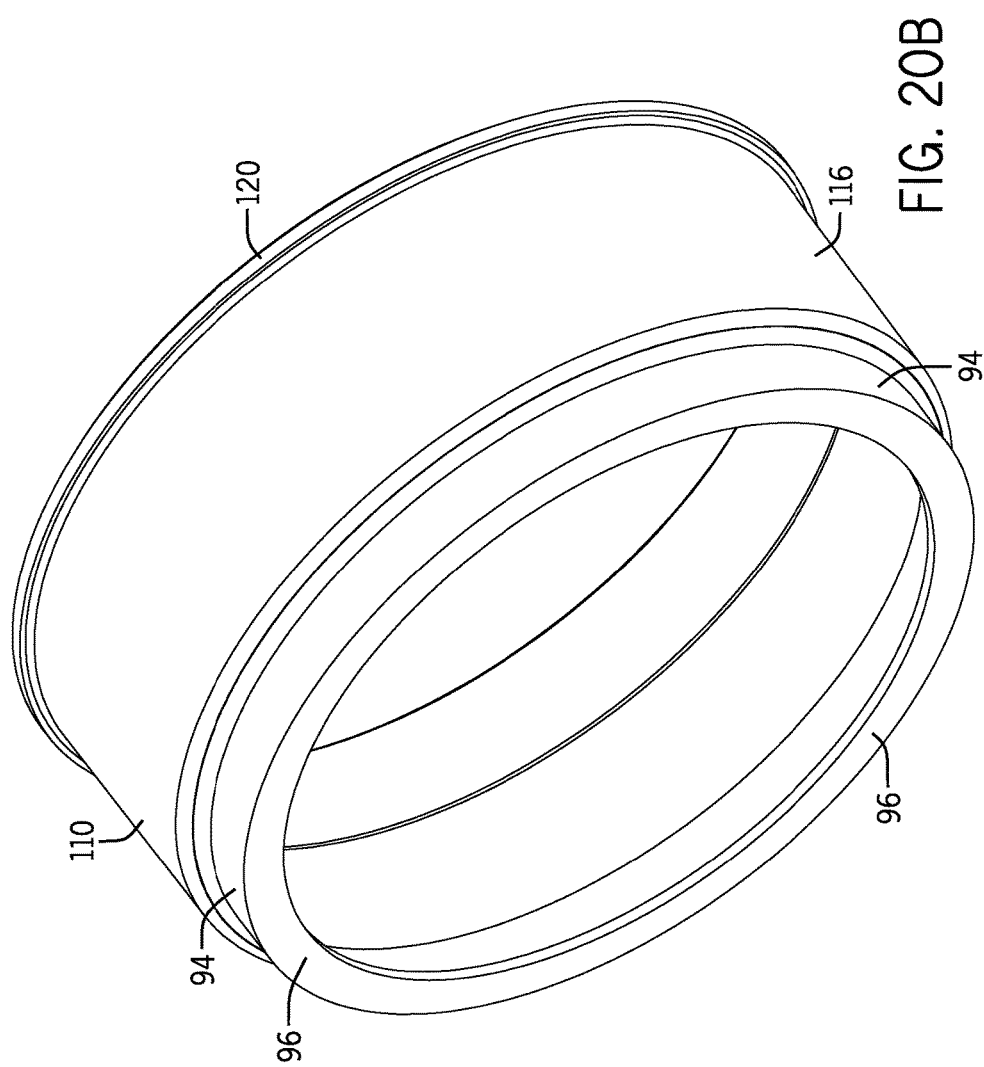

US 10,069,375 B2

ELECTRIC MACHINE MODULE COOLING SYSTEM AND METHOD

BACKGROUND

Electric machines, often contained within a machine cavity of a housing, generally include a stator and a rotor. For some electric machines, the stator can be secured to the housing different coupling techniques to generally secure the electric machine within the housing. During operation of some electric machines, heat energy can by generated by both the stator and the rotor, as well as other components of the electric machine. For some electric machines, the increase in heat energy can, at least partially, impact electric machine operations.

SUMMARY

Some embodiments of the invention provide an electric machine module. The module can include a housing, which can define a machine cavity. In some embodiments, the housing can comprise a sleeve member coupled to at least one end cap. In some embodiments, the sleeve member can include an outer sleeve member that can include a radially-inward extending flange and an inner sleeve member that can include a radially-outward extending flange, a thermal flange, and a stop region. In some embodiments, the outer sleeve member can be coupled to the inner sleeve member so that at least one coolant jacket is defined between the outer sleeve member and the inner sleeve member. In some embodiments, the coolant jacket can comprise at least one radial extension. In some embodiments, an electric machine can be positioned substantially within the machine cavity and can be at least partially enclosed by the housing. In some embodiments, the electric machine can include a stator assembly that can comprise stator end turns. In some embodiments, the electric machine can be positioned within the machine cavity so that at least some portions of the stator end turns can be adjacent to the radially inward extension.

DESCRIPTION OF THE DRAWINGS

FIG. 18 is a perspective view of a sleeve member according to one embodiment of the invention.

FIG. 19B is a perspective view of an inner sleeve member according to one embodiment of the invention.

FIG. 20A is a perspective view of a machined outer sleeve member according to one embodiment of the invention.

FIG. 20B is a perspective view of a machined inner sleeve member according to one embodiment of the invention.

DETAILED DESCRIPTION

Figure 1:
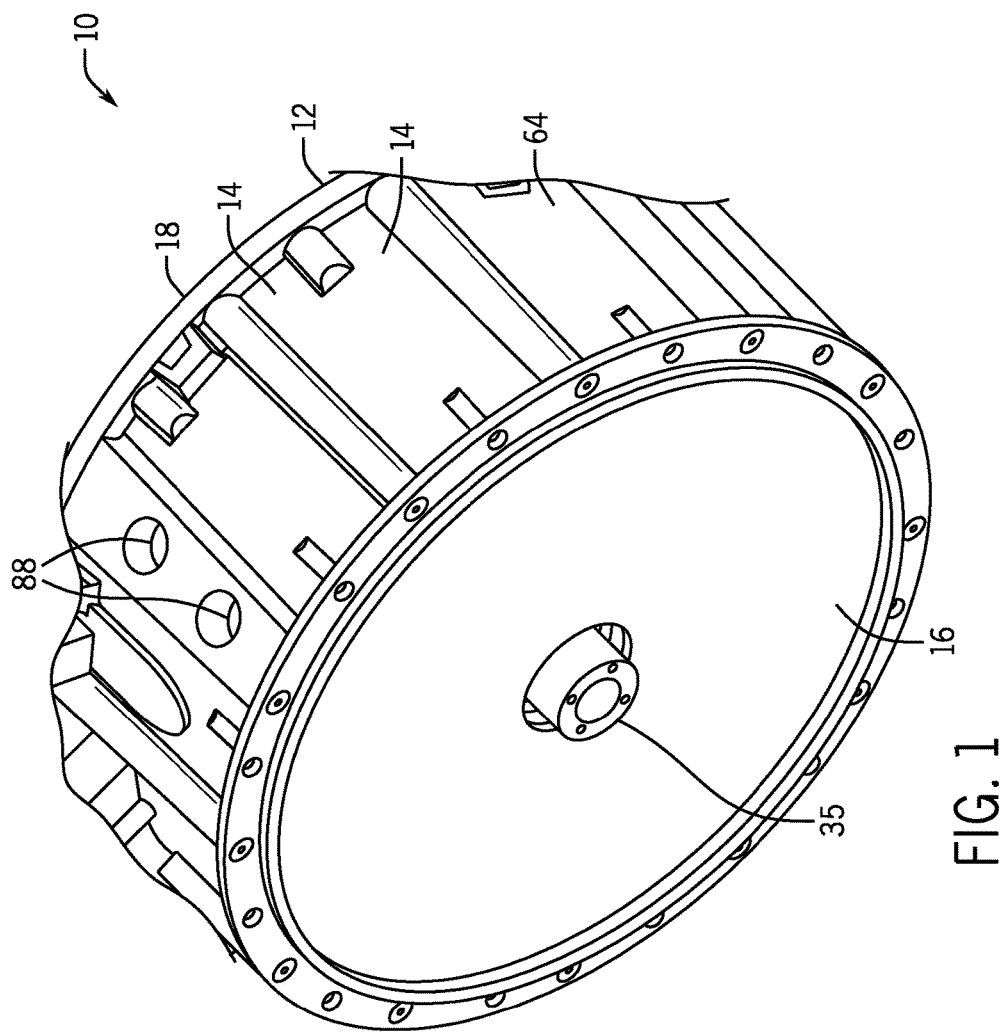
FIG. 1 is an isometric view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
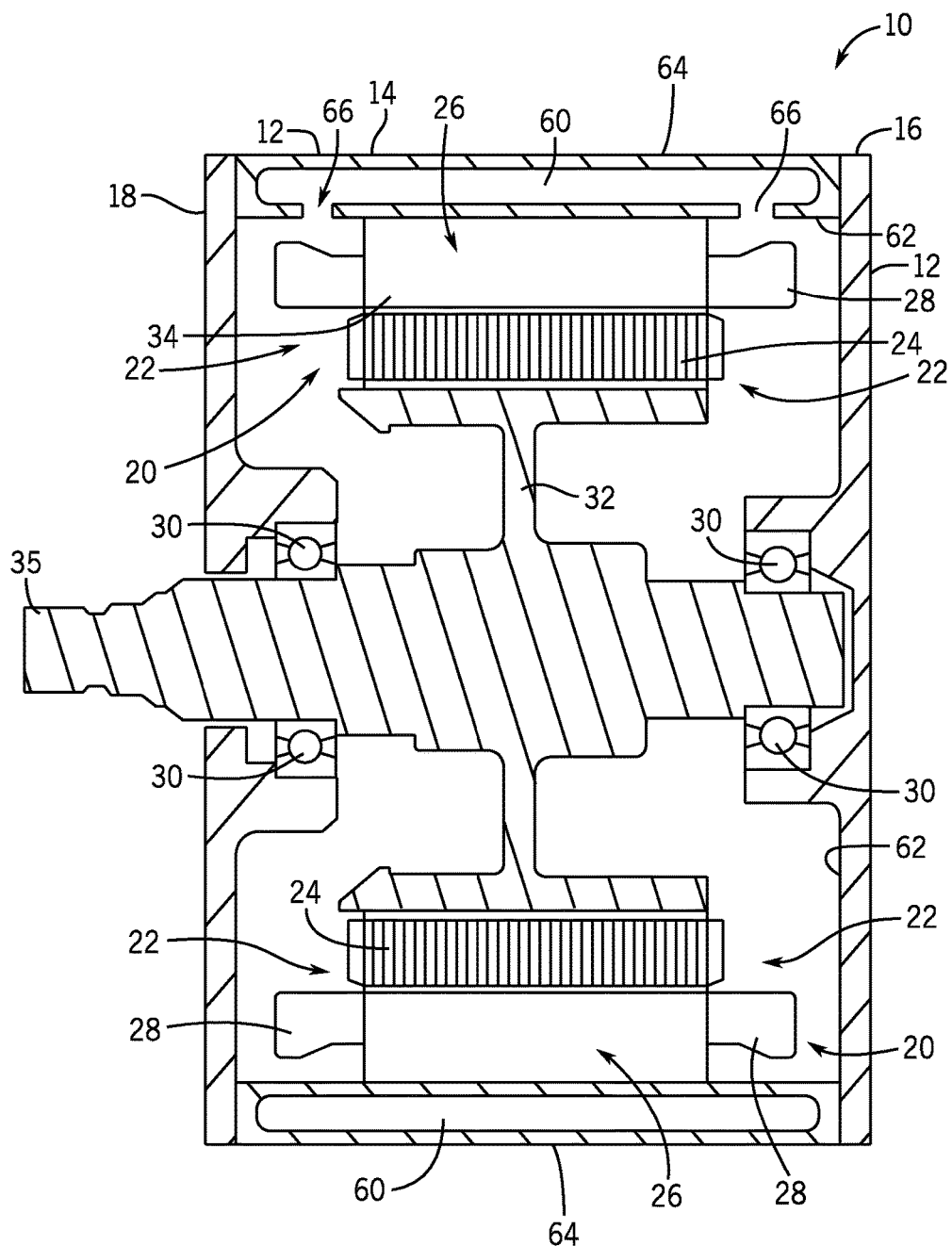
FIG. 2 is a cross-sectional view of a portion of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners 17, or another suitable coupling method, to enclose at least a portion of the electric machine 20 within the machine cavity 22. In some embodiments the housing 12 can comprise a substantially cylindrical canister and a single end cap (not shown). Further, in some embodiments, the module housing 12, including the sleeve member 14 and the end caps 16, 18, can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can include a rotor assembly 24, a stator assembly 26, including stator end turns 28, and bearings 30, and can be disposed about a shaft 35. As shown in FIG. 2, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the module housing 12. For example, the electric machine 20 can be fit within the housing 12. In some embodiments, the electric machine 20 can be fit within the housing 12 using an interference fit, a shrink fit, other similar friction-based fit that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in both axial and circumferential directions. In some embodiments, during operation of the electric machine 20 the fit between the stator assembly 26 and the module housing 12 can at least partially serve to transfer torque from the stator assembly 26 to the module housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

Figure 3:
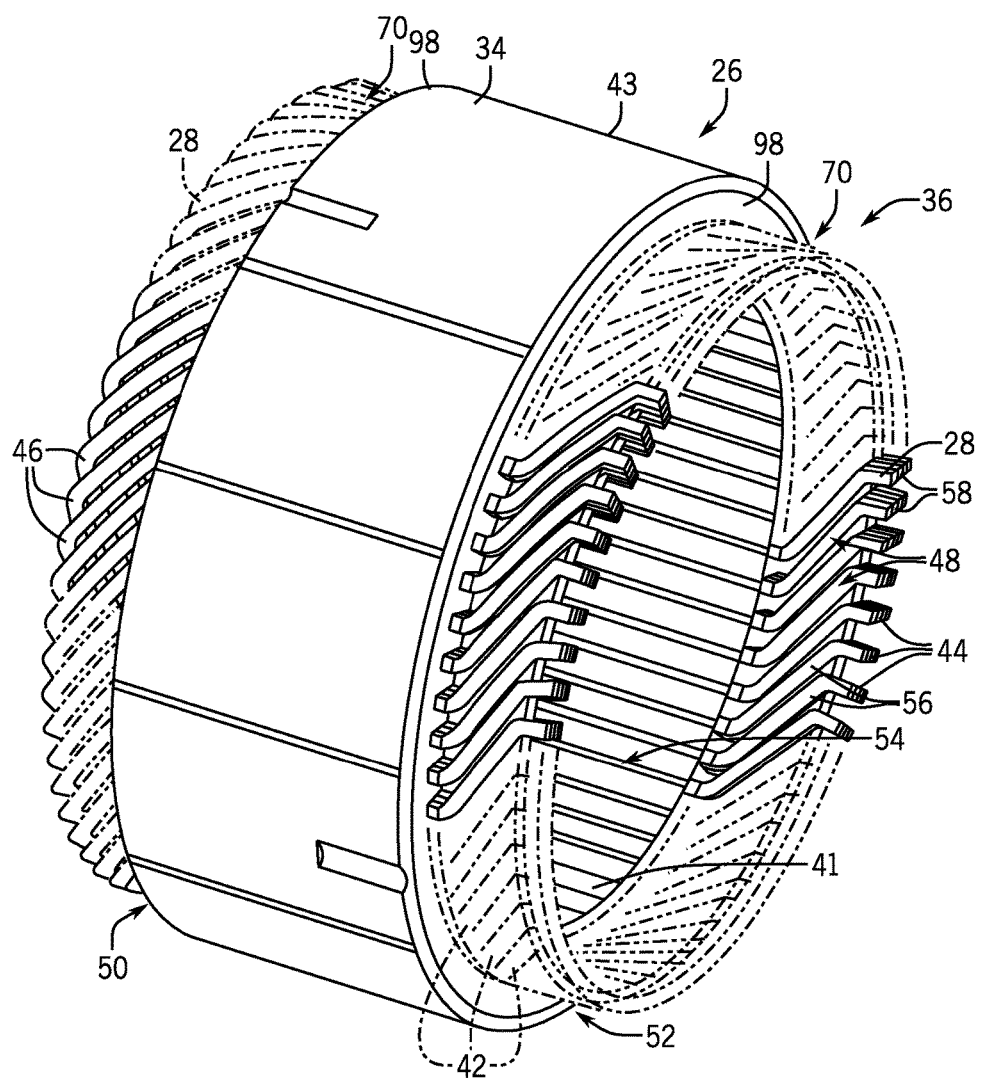
FIG. 3 is a perspective view of a stator assembly according to one embodiment of the invention.
Figure 4:
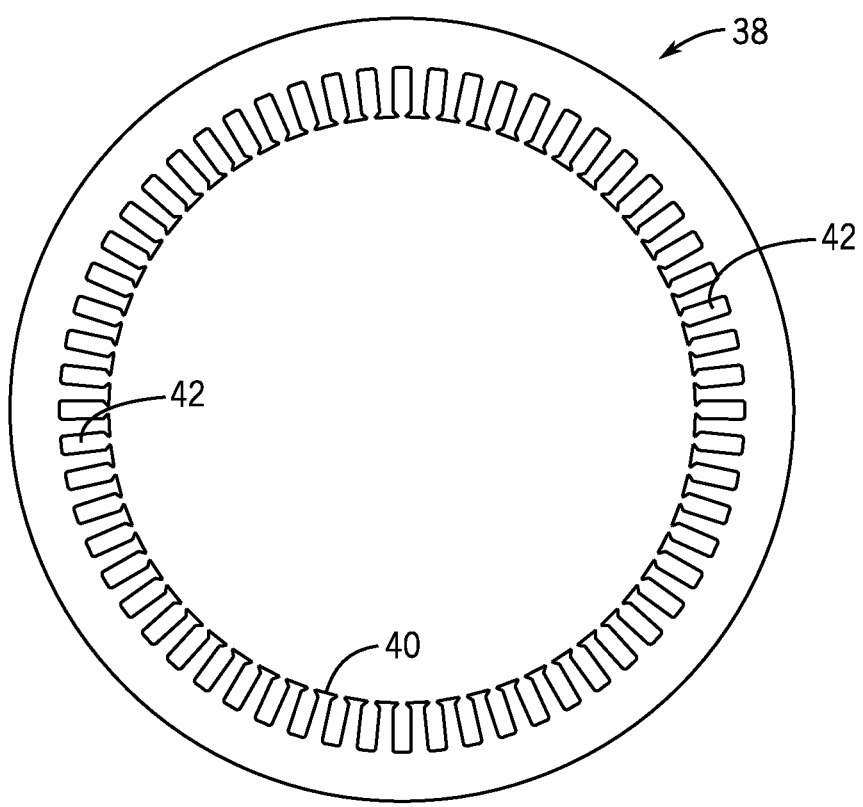
FIG. 4 is front view of a stator lamination according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 28 can include sixty slots 42. In other embodiments, the laminations 38 can include more or fewer teeth 40, and, accordingly, the stator core 34 can include more or fewer slots 42. Moreover, in some embodiments, the stator core 34 can comprise an inner perimeter 41 and an outer perimeter 43. For example, in some embodiments, the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
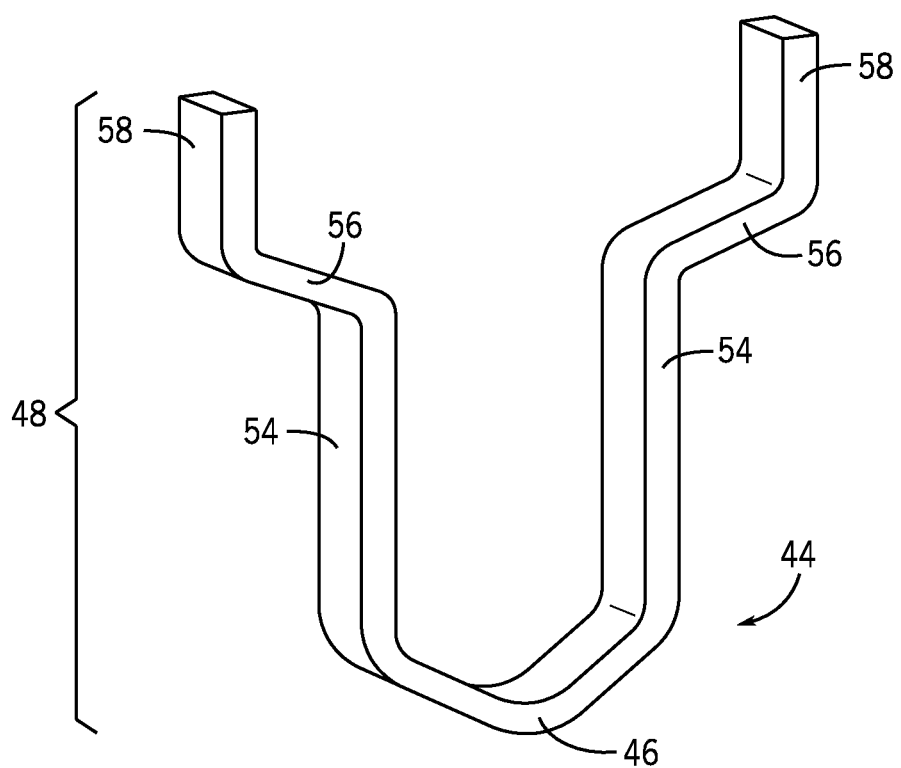
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIGS. 3 and 5. For example, in some embodiments, at least a portion of the conductors 44 can include a turn portion 46 and at least two leg portions 48. The turn portion 46 can be disposed between the two leg portions 48 to connect the two leg portions 48, which can be substantially parallel. Moreover, in some embodiments, the turn portion 46 can comprise a substantially "u-shaped" configuration, although, in some embodiments, the turn portion 46 can comprise a v-shape, a wave shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segmented configuration).

In some embodiments, as shown in FIG. 3, at least a portion of the conductors 44 can be positioned substantially within the slots 42. For example, in some embodiments, the stator core 34 can be configured so that the plurality of slots 42 are substantially axially arranged. The leg portions 48 can be inserted into the slots 42 so that at least some of the leg portions 48 can axially extend through the stator core 34. In some embodiments, the leg portions 48 can be inserted into neighboring slots 42. For example, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at a first axial end 50 of the stator core 34 and at least some of the leg portions 48 axially extend from the stator core 34 at a second axial end 52 of the stator core 34. In some embodiments, at least a portion of the conductor 44 regions that axially extend from the core 34 at the axial ends 50, 52 can comprise the stator end turns 28.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the two leg portions 48 of a single conductor 44.

In some embodiments, at least some of the leg portions 48 can comprise multiple regions. The leg portions 48 can comprise in-slot portions 54, angled portions 56, and connection portions 58. In some embodiments, as previously mentioned, the leg portions 48 can be disposed in the slots 42 and can axially extend from the first end 50 to the second end 52. In some embodiments, after insertion, at least a portion of the leg portions 48 positioned within the slots 42 can comprise the in-slot portions 58. In some embodiments, in some or all of the slots 42, the leg portions 48 can be substantially radially aligned, as shown in FIG. 3. In some embodiments, in some or all of the slots 42, the leg portions 48 can comprise other configurations.

In some embodiments, at least some of stator end turns 28 extending from stator core 34 at the second axial end 52 can comprise the angled portions 56 and the connection portions 58. In some embodiments, after inserting the conductors 44 into the stator core 34, the leg portions 48 extending from the stator core 34 at the second axial end 52 can undergo a twisting process (not shown) that can lead to the formation of the angled portions 56 and the connection portions 58. For example, in some embodiments, the twisting process can give rise to the angled portions 56 at a more axially inward position and the connection portions 58 at a more axially outward position, as shown in FIGS. 3 and 5. In some embodiments, after the twisting process, the connection portions 58 of at least a portion of the conductors 44 can be immediately adjacent to connection portions 58 of other conductors 44. As a result, the connection portions 58 can be coupled together to form one or more stator windings 36. In some embodiments, the connection portions 58 can be coupled via welding, brazing, soldering, melting, adhesives, or other coupling methods. Additionally, in some embodiments, the angled portions 56 and the connection portions 58 can extend from the first axial end 50 and can be configured and arranged in a similar manner as some previously mentioned embodiments.

Figure 6:
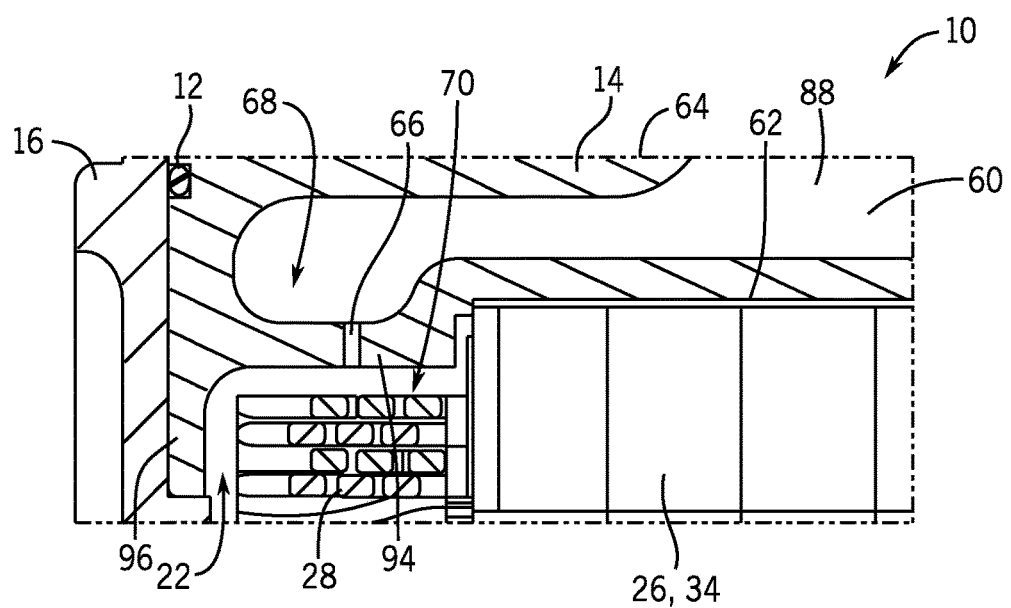
FIG. 6 is a partial cross-sectional view of a portion of an electric machine module according to one embodiment of the invention.

As shown in FIGS. 2 and 6, in some embodiments, the housing 12 can comprise a coolant jacket 60 In some embodiments, the housing 12 can include an inner surface 62 and an outer surface 64 and the coolant jacket 60 can be positioned substantially between at least a portion the surfaces 62, 64. For example, in some embodiments, the machine cavity 22 can be at least partially defined by the inner surface 62 (e.g., each of the elements of the housing 12 can comprise a portion of the inner surface 62). In some embodiments, the coolant jacket 60 can substantially circumscribe at least a portion of the electric machine 20. For example, in some embodiments, the coolant jacket 60 can substantially circumscribe at least a portion of the outer perimeter 43 of the stator assembly 26 (e.g., the stator core 34 and the stator winding 36), including portions of the stator end turns 28.

Further, in some embodiments, the coolant jacket 60 can contain a coolant that can comprise transmission fluid, ethylene glycol, an ethylene glycol/water mixture, water, oil, motor oil, a gas, a mist, or another substance. The coolant jacket 60 can be in fluid communication with a coolant source (not shown) which can pressurize the coolant prior to or as it is being dispersed into the coolant jacket 60, so that the pressurized coolant can circulate through the coolant jacket 60.

Also, in some embodiments, the inner surface 62 can comprise one or more coolant apertures 66 so that the coolant jacket 60 can be in fluid communication with the machine cavity 22. In some embodiments, the coolant apertures 66 can be positioned substantially adjacent to the stator end turns 28. For example, in some embodiments, as the pressurized coolant circulates through the coolant jacket 60, at least a portion of the coolant can exit the coolant jacket 60 through the coolant apertures 66 and enter the machine cavity 22. Also, in some embodiments, the coolant can contact the stator end turns 28, which can lead to at least partial cooling. After exiting the coolant apertures 66, at least a portion of the coolant can flow through the machine cavity 22 and can contact various module 10 elements, which, in some embodiments, can lead to at least partial cooling of the module 10.

According to some embodiments of the invention, the coolant jacket 60 can include multiple configurations. In some embodiments, at least a portion of the coolant jacket 60 can extend through portions of the housing 12 (e.g., the sleeve member 14) a distance substantially similar to an axial length of the stator assembly 26. For example, an axial length of a portion of the coolant jacket 60 can extend at least the same distance as the axial length of the stator assembly 26, including the stator end turns 28. In some embodiments, portions of the coolant jacket 60 can extend greater and lesser axial distances, as desired by manufacturers and/or end users for cooling.

In some embodiments, a portion of the coolant jacket 60 also can comprise at least one radial extension 68. For example, as shown in FIG. 6, in some embodiments, a region of the inner surface 62 can be radially recessed (e.g., a stop region, as discussed below) so that the radial extension 68 of the coolant jacket 60 can be substantially adjacent to at a portion of the stator end turns 28. In some embodiments, radial extensions 68 can be positioned adjacent to one side of, both sides of, or neither sides of the stator end turns 28. Further, in some embodiments, the coolant jacket 60 can comprise radial extensions 68 substantially continuously adjacent to at least a portion of an outer diameter 70 of at least one set of the stator end turns 28 (i.e., one continuous radial extension 68 around at least a portion of a circumference of at least one set of the stator end turns 28). In other embodiments, the coolant jacket 60 can comprise substantially discrete radial extensions 68 positioned around at least a portion of the outer diameter 70 of at least one set of the stator end turns 28. In some embodiments, the housing 12 can comprise at least two radial extensions 68. For example, in some embodiments, the housing 12 can comprise two halves coupled together in a substantially axially central location so that each half of the housing 12 can comprise a radial extension 68 and the electric machine 20 can be positioned substantially between the two halves.

In some embodiments, the stator end turns 28 can comprise a generally lesser outer diameter 70 compared to the outer diameter 43 of the stator core 34. As a result, a greater distance can exist between the stator end turns 28 and the cooling jacket 60 in some conventional configurations because at least some conventional coolant jackets 60 comprise a generally linear and/or uniform configuration (e.g., some conventional coolant jackets 60 comprise a generally planar configuration). In some embodiments, the radial extensions 68 of the coolant jacket 60 can enhance module 10 cooling because some of the coolant can circulate relatively more adjacent to the stator end turns 28, compared to conventional coolant jacket 60 configurations that lack radial extensions 68. As a result, in some embodiments, a distance between the circulating coolant and an area rejecting thermal energy (e.g., the stator end turns 28) can be minimized, which can lead to generally increased heat energy transfer.

In some embodiments, the housing 12 (e.g., sleeve member 14) and/or the coolant jacket 60 can comprise other configurations. In some embodiments, at least some portions of the housing 12 can be at least partially formed using a casting process. By way of example only, in some embodiments, the sleeve member 14 can be formed using a die-casting process (e.g., a conventional open-and-close casting process), which can result in an at least partial reduction in housing 12 cost and complexity relative to other forms of housing 12 manufacture (e.g., extruding, machining, etc.). In some embodiments, the housing 12 can be formed (e.g., cast) so that the coolant jacket 60 is positioned substantially similar to other embodiments of the invention. In some embodiments, the housing 12 can be formed so that the coolant jacket 60 can comprise other configurations, as described below.

Figure 7A:
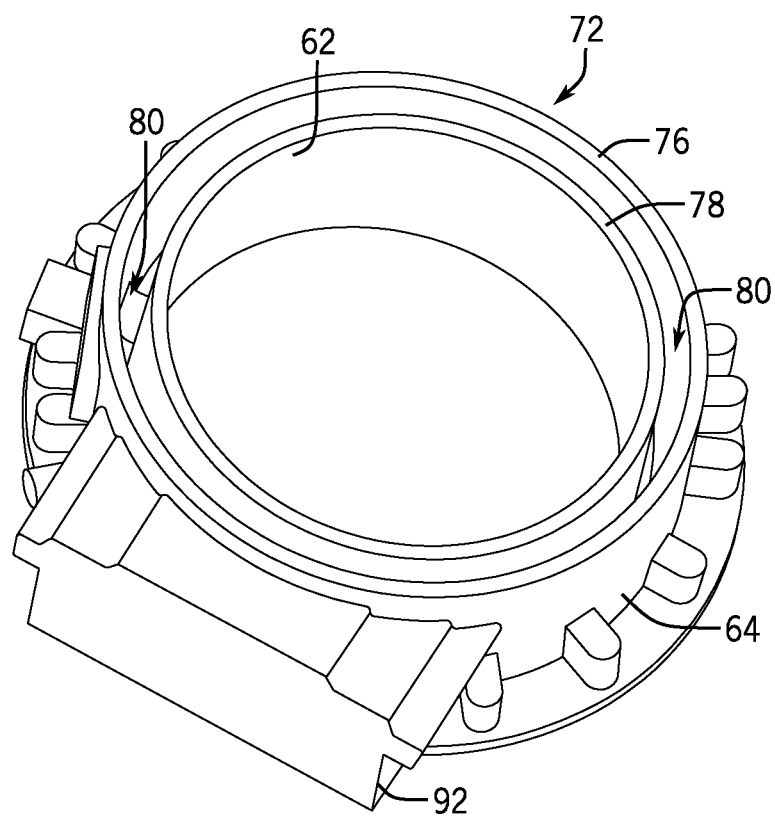
FIG. 7A is a perspective view of first axial sleeve member according to one embodiment of the invention.
Figure 7B:
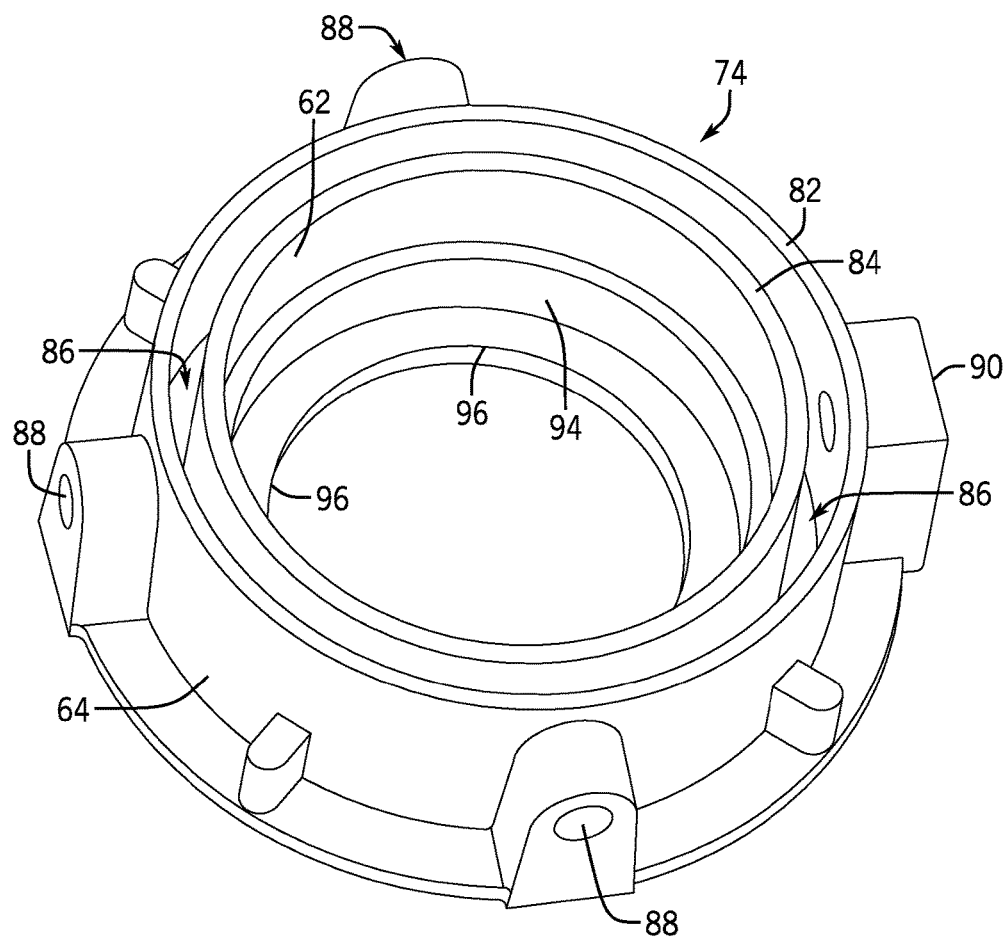
FIG. 7B is a perspective view of a second axial sleeve member according to one embodiment of the invention.

In some embodiments, at least a portion of the housing 12 can comprise alternative configurations. As shown in FIGS. 7A-8B, in some embodiments, the sleeve member 14 can comprise a plurality of axial sleeve members. For example, as shown in FIGS. 7A and 7B, the sleeve member 14 can comprise a first axial sleeve member 72 that is capable of being coupled to a second axial sleeve member 74. In some embodiments, the first axial sleeve member 72 and the second axial sleeve member 74 can comprise substantially similar configurations. In other embodiments, the first axial sleeve member 72 and the second axial sleeve member 74 can comprise different configurations. Moreover, in some embodiments, the first axial sleeve member 72 can be coupled to the second sleeve member 74 using at least one of conventional welding, friction welding, brazing, adhesives, conventional fasteners, or any other suitable coupling methods.

In some embodiments, the first and second axial sleeve members 72, 74 can be formed using a conventional casting process. In some embodiments, the casting process can comprise a conventional open-and-close casting process. Additionally, in some embodiments, the first and the second axial sleeve members 72, 74 can be cast from one or more materials, such as aluminum-comprising materials. In other embodiments, at least one of the first and second axial sleeve members 72, 74 can be formed using other manufacturing processes, such as, but not limited to, molding, extruding, machining, etc. Moreover, although the following discussion of the first and second axial sleeve members 72, 74 refers to the sleeve members 72, 74 as being cast, this is only to serve as an exemplary embodiment and is not intended to limit the scope of this invention.

Figure 8A:
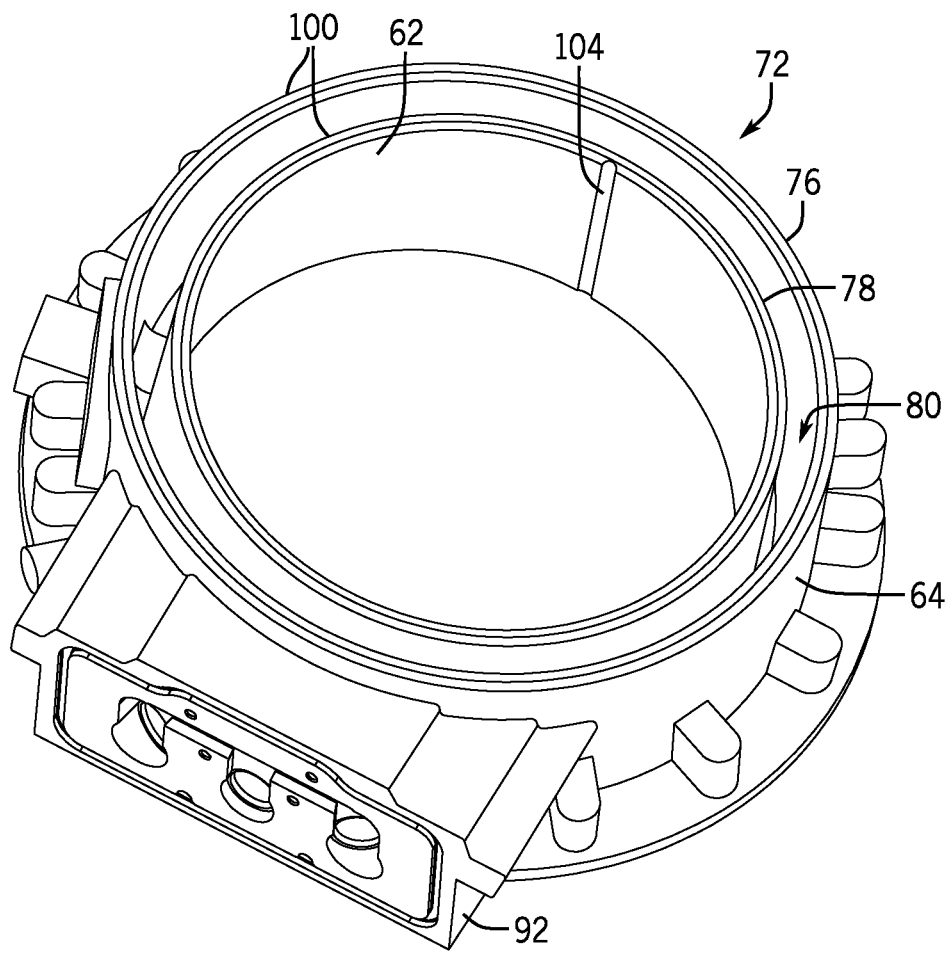
FIG. 8A is a perspective view of a machined first axial sleeve member according to one embodiment of the invention.

In some embodiments, the first and second axial sleeve members 72, 74 can comprise one or more flanges. As shown in FIGS. 7A and 8A, in some embodiments, the first axial sleeve member 72 can be formed (e.g., cast) so that it comprises a first flange 76 and a second flange 78. In some embodiments, the flanges 76, 78 can be configured and arranged to define a first recess 80 therebetween. As shown in FIGS. 7A and 8A, in some embodiments, the first axial sleeve member 72 can be configured so that the first flange 76 is disposed radially outward from the second flange 78. For example, in some embodiments, an outer surface of the first flange 76 can comprise a portion of the outer surface 64 of the sleeve member 14 when the first and second axial sleeve members 72, 74 are coupled together. Moreover, in some embodiments, an inner surface of the second flange 78 can comprise a portion of the inner surface 62 of the sleeve member 14 when the first and second axial sleeve members 72, 74 are coupled together.

Figure 8B:
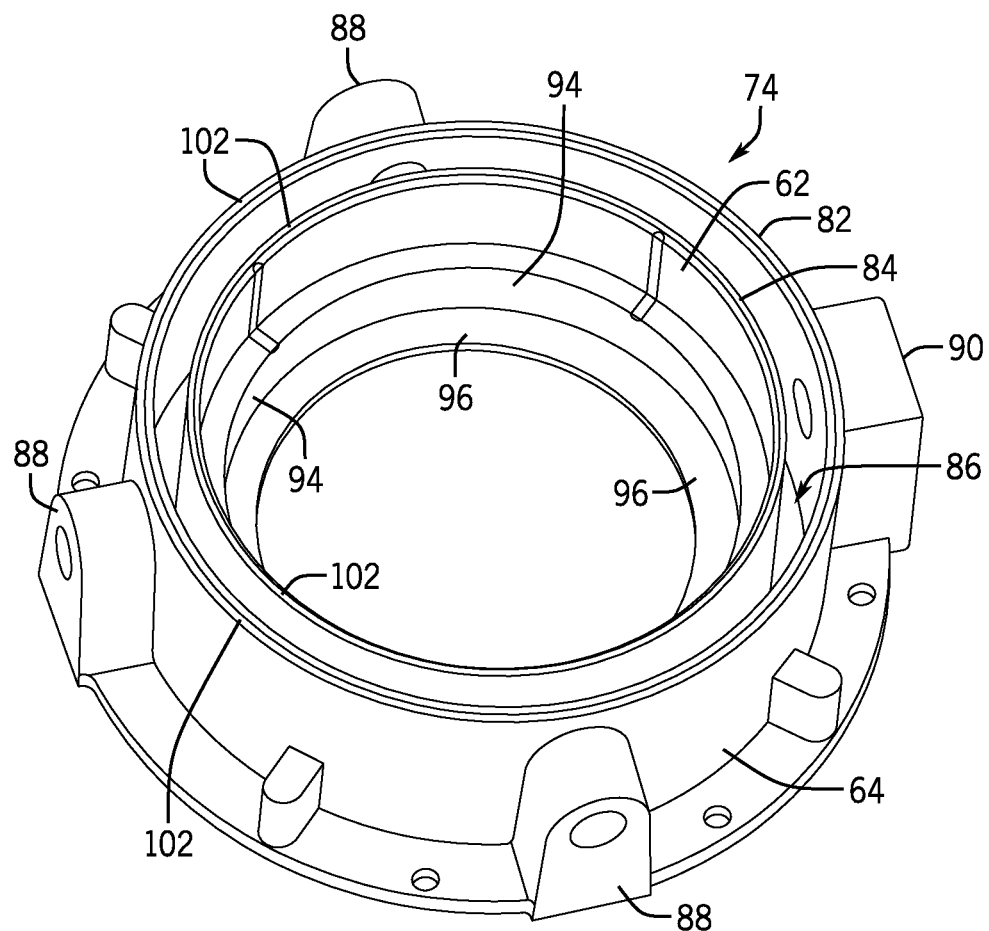
FIG. 8B a perspective view of a machined second axial sleeve member according to one embodiment of the invention.
Figure 9:
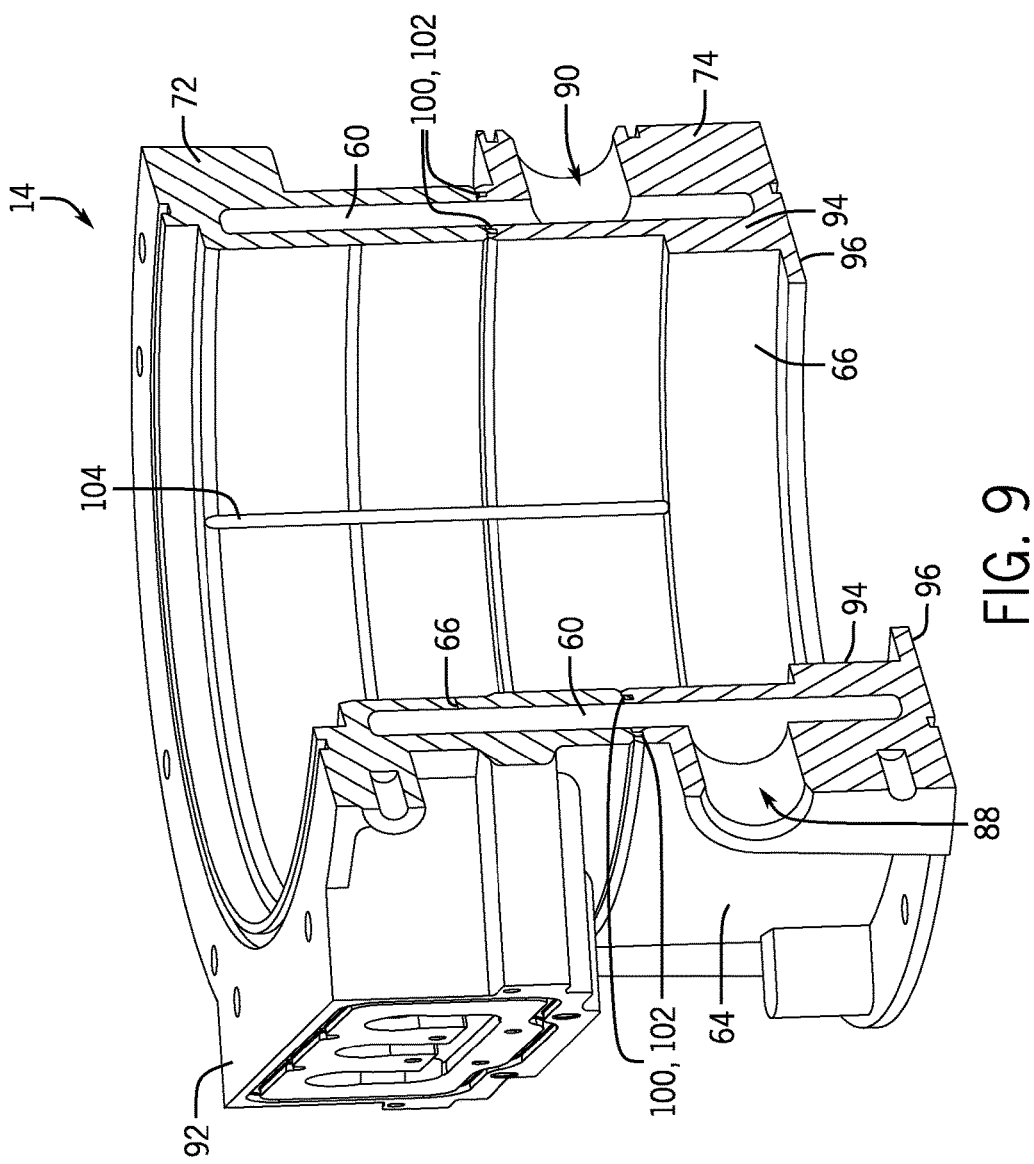
FIG. 9 is a perspective cross-sectional view of a sleeve member according to one embodiment of the invention.
Figure 10:
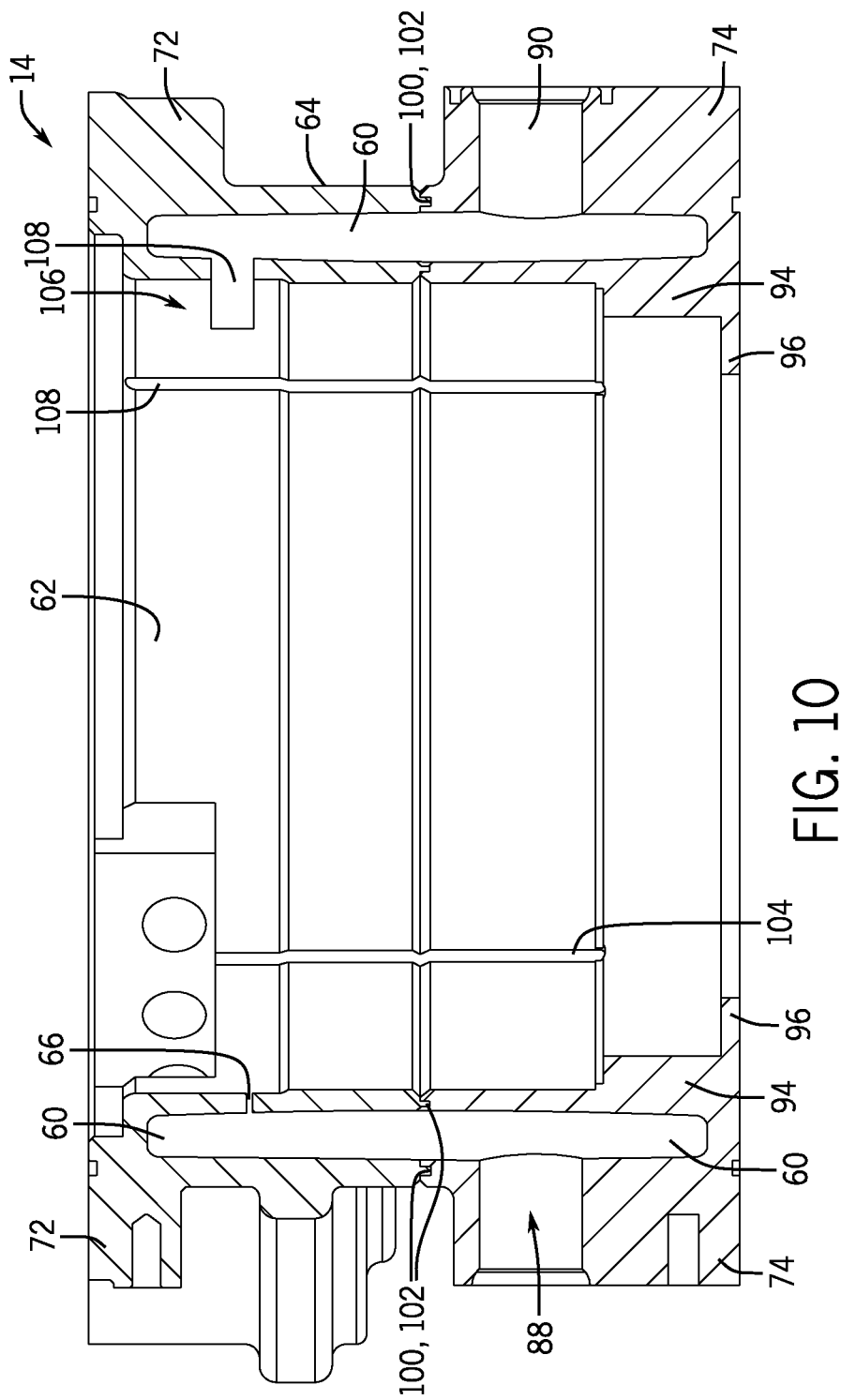
FIG. 10 a cross-sectional view of a sleeve member according to one embodiment of the invention.
Figure 11:
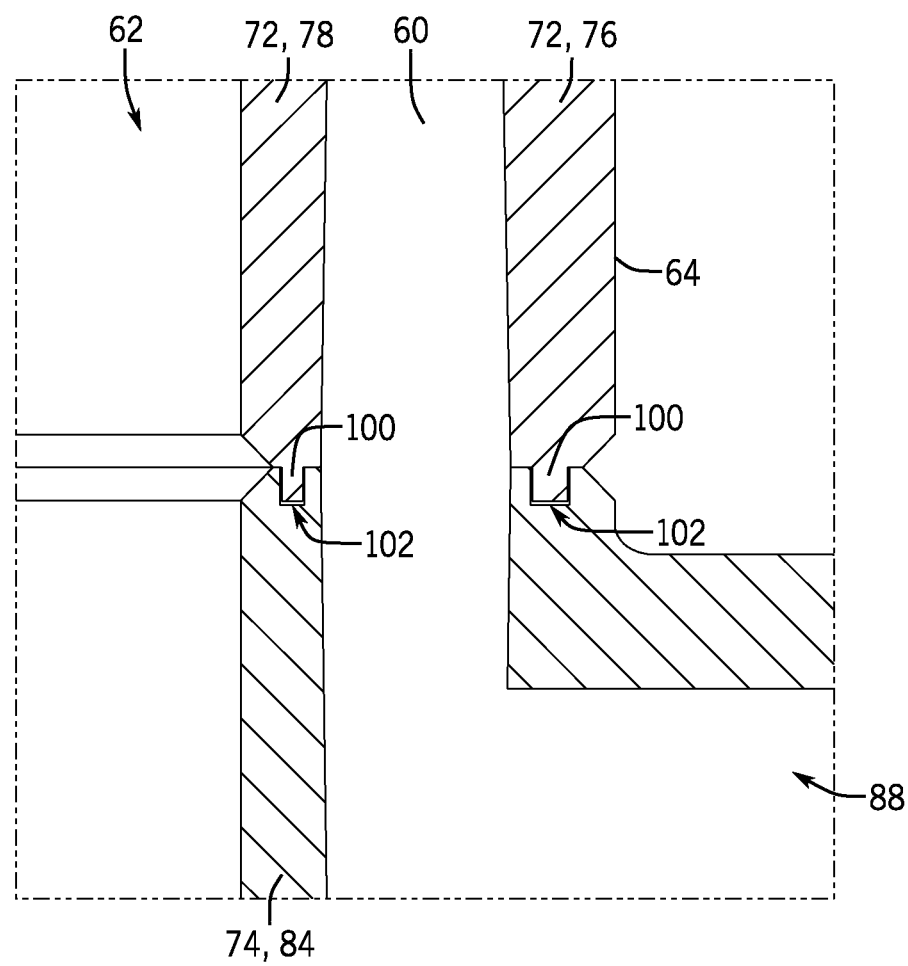
FIG. 11 is an expanded view of a portion of the sleeve member of FIG. 10.
Figure 12:
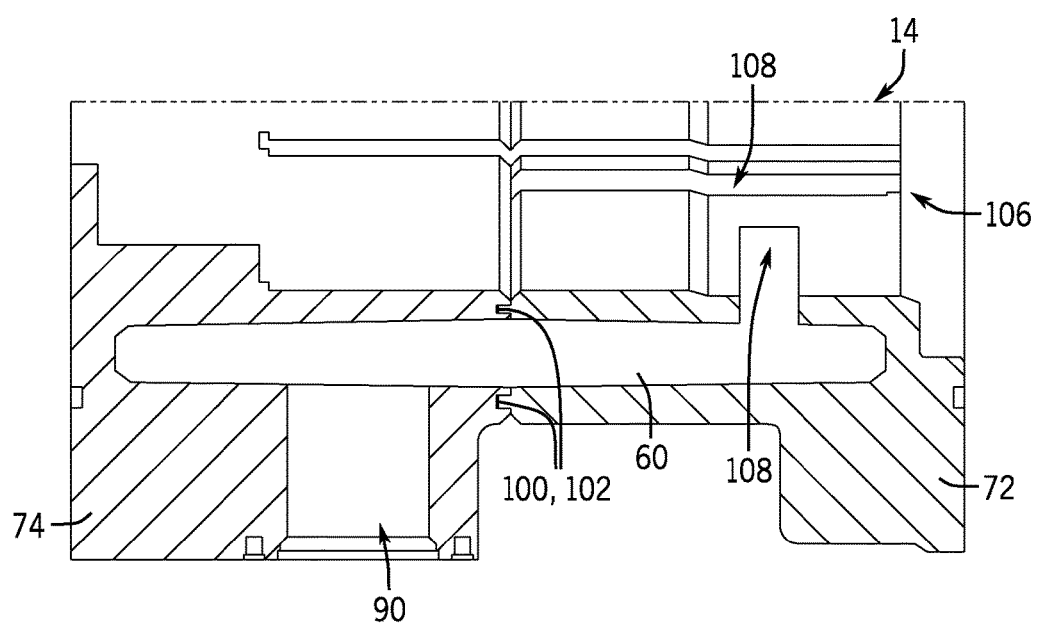
FIG. 12 is an expanded view of a portion of the sleeve member of FIG. 10.
Figure 13:
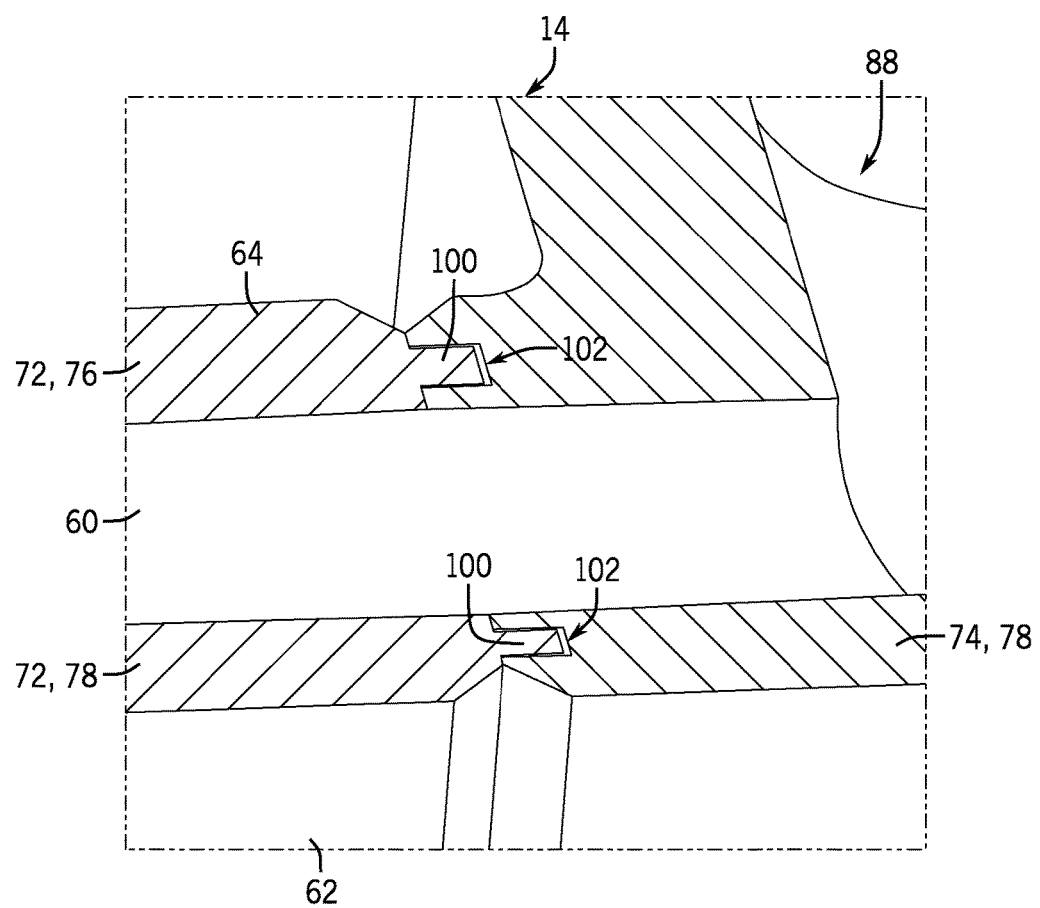
FIG. 13 is an expanded view of a portion of the sleeve member of FIG. 10.
Figure 14:
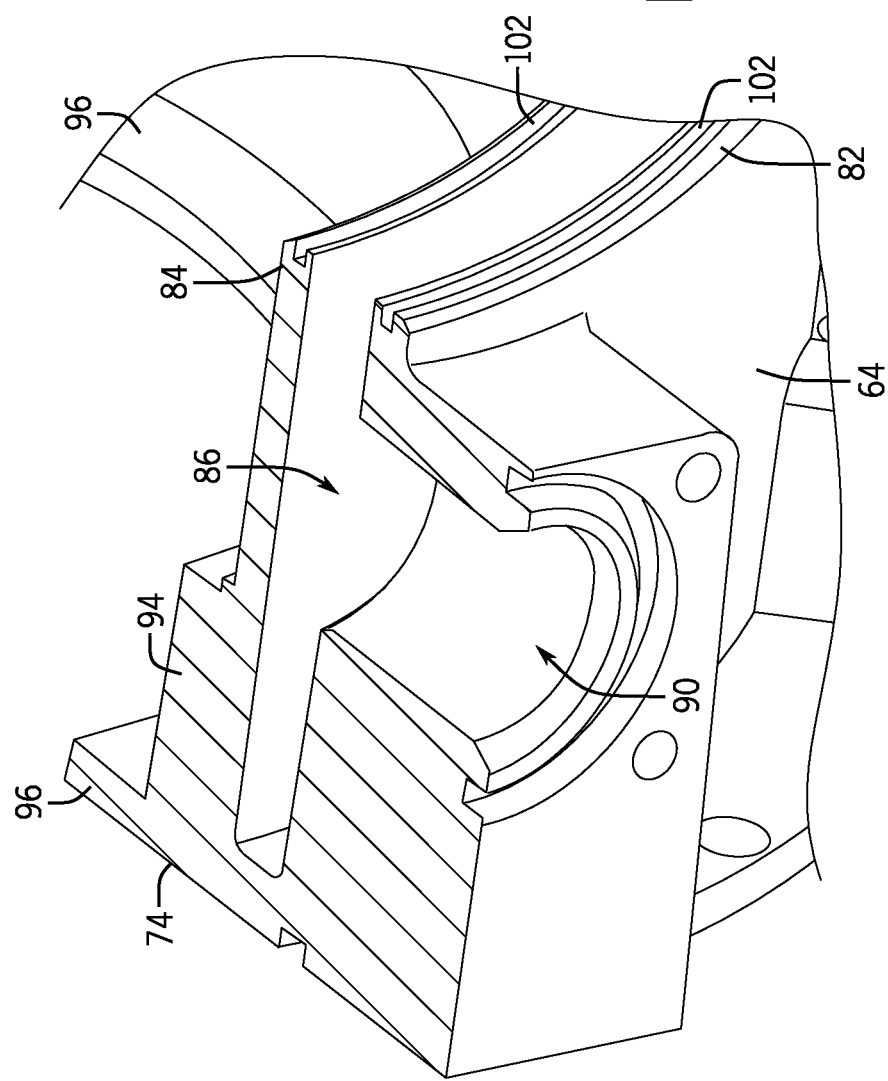
FIG. 14 is an expanded cross-sectional view of a second axial sleeve member according to one embodiment of the invention.
Figure 15:
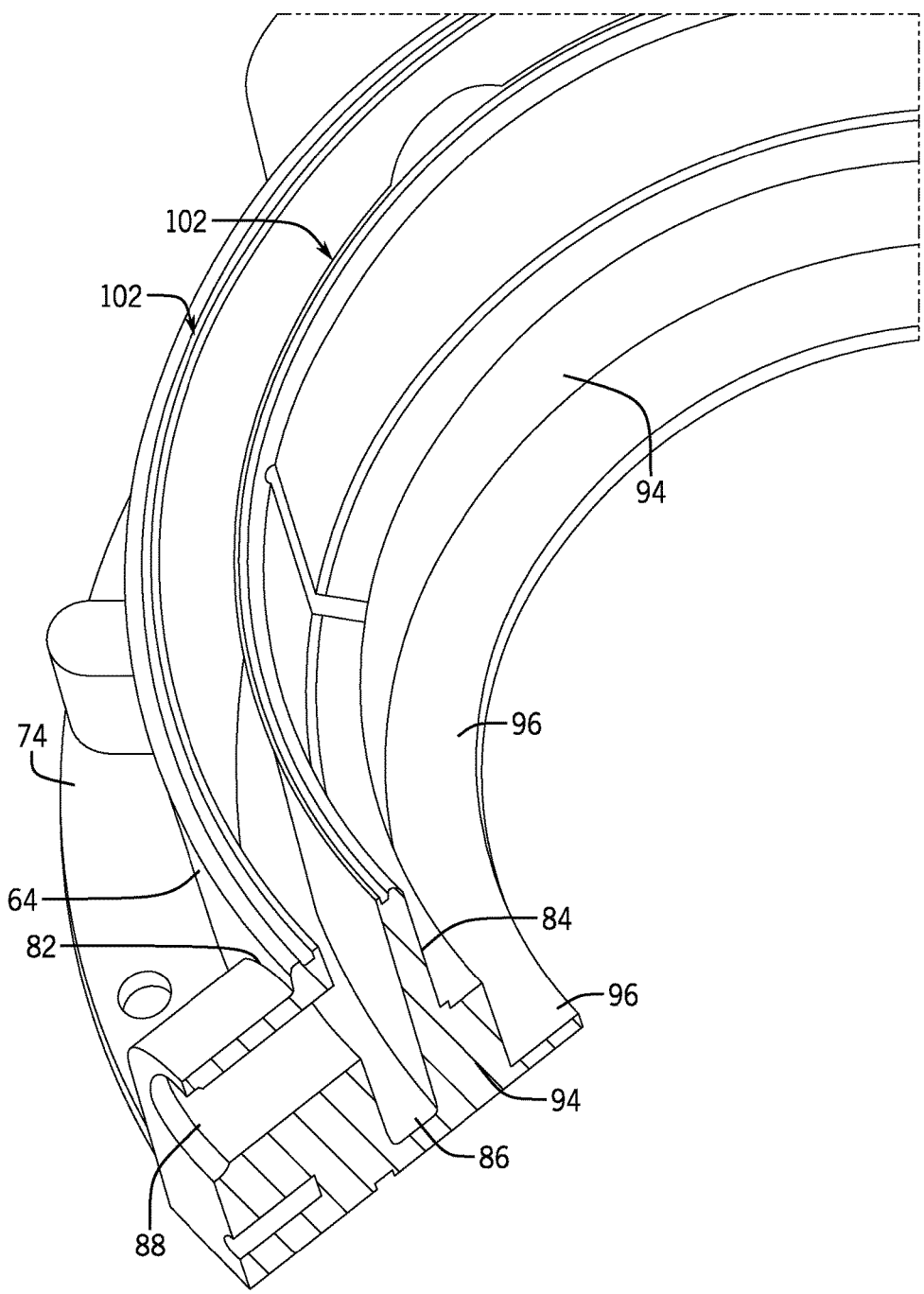
FIG. 15 a perspective cross-sectional view of a second axial sleeve member according to one embodiment of the invention.
Figure 16:
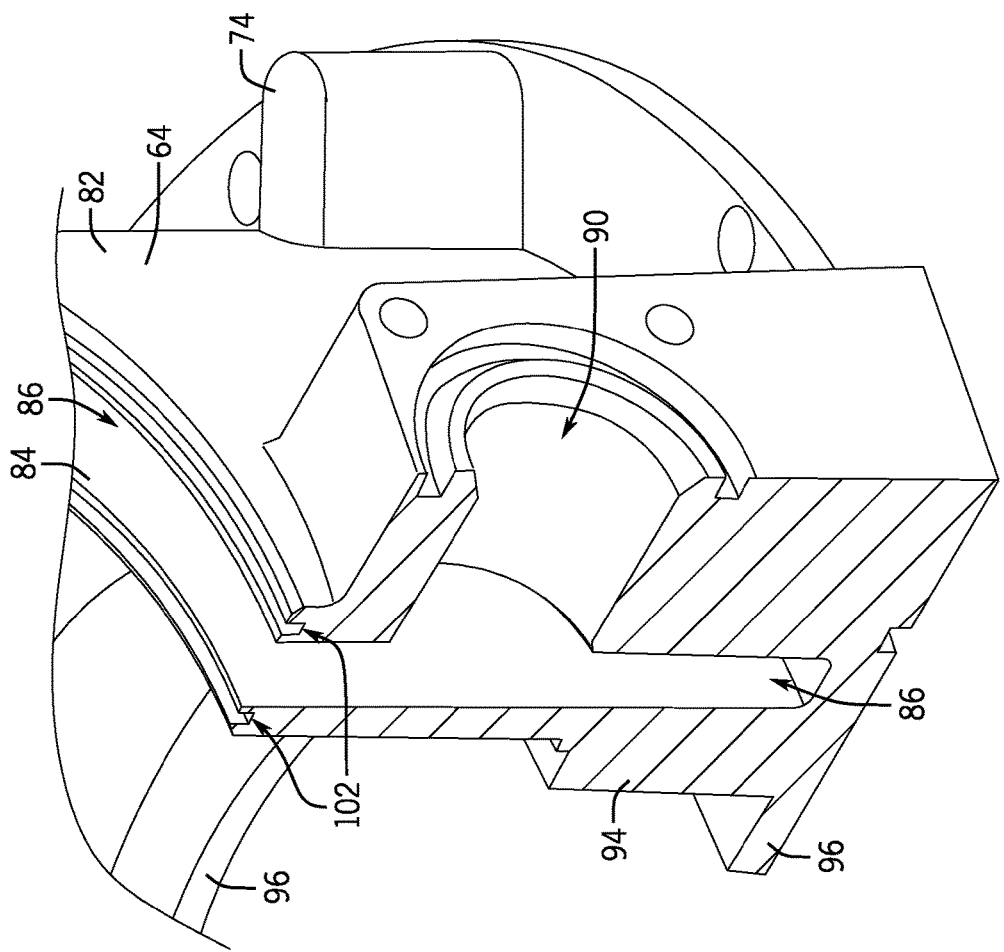
FIG. 16 is an expanded cross-sectional view of a second axial sleeve member according to one embodiment of the invention
Figure 17:
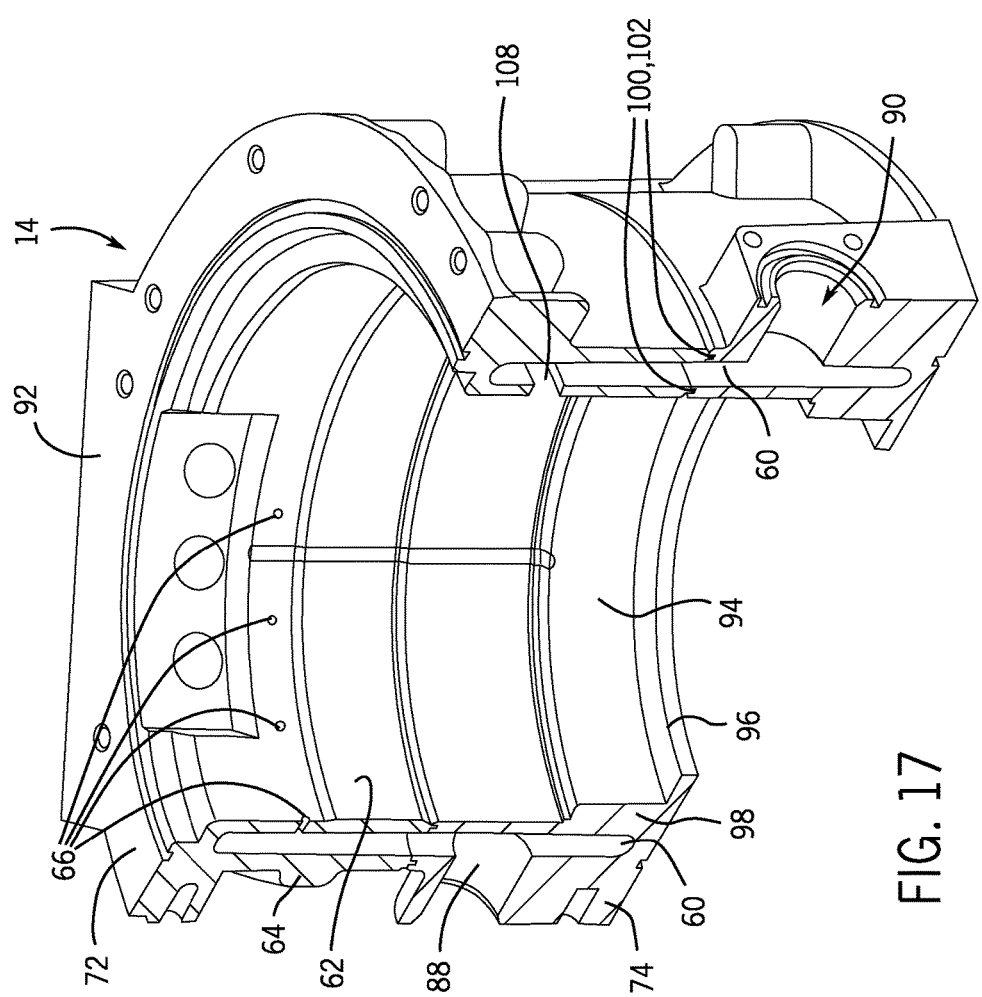
FIG. 17 is a perspective cross-sectional view of a sleeve member according to one embodiment of the invention.

As shown in FIGS. 7B and 8B, in some embodiments, the second axial sleeve member 74 can comprise a substantially similar configuration. For example, the second axial sleeve member 74 can be formed (e.g., cast) so that it comprises a third flange 82 and a fourth flange 84. In some embodiments, the flanges 82, 84 can be configured and arranged to define a second recess 86 therebetween. As shown in FIGS. 7B and 8B, in some embodiments, the second axial sleeve member 74 can be configured so that the third flange 82 is disposed radially outward from the fourth flange 84. For example, in some embodiments, an outer surface of the third flange 82 can comprise a portion of the outer surface 64 of the sleeve member 14 when the first and second axial sleeve members 72, 74 are coupled together. Moreover, in some embodiments, an inner surface of the fourth flange 84 can comprise a portion of the inner surface 62 of the sleeve member 14 when the first and second axial sleeve members 72, 74 are coupled together.

In some embodiments, the first and the second axial sleeve members 72, 74 can be formed with additional elements. For example, as shown in FIGS. 7B and 8B, the first axial sleeve member 72 and/or the second axial sleeve member 74 can comprise one or more inlets 88. In some embodiments, one of the first and second axial sleeve members 72, 74 can comprise at least one inlet 88. For example, as shown in FIGS. 7B and 8B, in some embodiments, the second axial sleeve member 74 can comprise a plurality of inlets 88 (e.g., three) and at least one outlet 90. In some embodiments, the second axial sleeve member 74 can comprise a substantially annular configuration and the inlets 88 and the outlet 90 can be separated by approximately ninety degrees (e.g., inlets 88 disposed adjacent to the three-o'clock, nine-o'clock, and twelve-o'clock positions and the outlet 90 adjacent to the six-o'clock position). As shown in FIGS. 7B and 8B, at least a portion of the inlets 88 and the outlet 90 can be in fluid communication with the second recess 86. Additionally, in some embodiments, after completing manufacture of the electric machine module 10, the end user and/or manufacturer can select one or more of the inlets 88 for use and seal some or all of the remaining inlets 88 so that no extraneous materials enter the second recess 86 and/or the coolant jacket 60.

In some embodiments, the second axial sleeve member 74 can comprise other elements. As shown in FIGS. 7B and 8B, the second axial sleeve member 74 can comprise a stop region 94 and a thermal flange 96. For example, the second axial sleeve member 74 can be cast to include the stop region 94 and the thermal flange 96. In some embodiments, the stop region 94 and the thermal flange 96 can comprise radially inward extensions of the inner surface 62 of the second axial sleeve member 74.

Moreover, in some embodiments, as shown in FIG. 6, the thermal flange 96 and the stop region 94 can be configured and arranged to engage and/or be in thermal communication with portions of the stator assembly 26. For example, in some embodiments, an axial face 98 of the stator core 34 can engage the stop region 94 during assembly of the electric machine module 10. As a result, the stop region 94 can be used to position the stator assembly 26 within the housing 12 (e.g., the stop region 94 can limit axial movement of the stator assembly 26 during assembly). Moreover, engagement of the stop region 94 and the stator core 34 can enable improved thermal communication between the stator assembly 26 and the housing 12. The engagement of the stop region 94 and the stator core 34 can enable thermal energy to be conducted from the stator assembly 26 to the housing 12, which can improve cooling.

Additionally, in some embodiments, the thermal flange 96 can be similarly configured. As shown in FIGS. 6, 7B, and 8B, the thermal flange 96 can extend radially inward and portions of the stator end turns 28, upon installing the stator assembly 26 within the housing 12, can be disposed adjacent to the thermal flange 96. As a result of the thermal flange's 96 proximity to portions of the stator end turns 28, at least a portion of the thermal energy produced by the stator end turns 28 can be transferred to the thermal flange 96 for improved cooling. Moreover, in some embodiments, portions of the stator end turns 28 can be at least partially protected from some or all potentially damaging forces by the thermal flange 96. Additionally, in some embodiments, the thermal flange 96 and the stop region 94 can further enhance cooling by functioning to concentrate at least a portion of coolant adjacent to the stator end turns 28 (e.g., coolant exiting the coolant jacket 60 via one or more coolant apertures 66).

Moreover, as shown in FIGS. 7A and 8A, in some embodiments, the first axial sleeve member 72 can comprise additional elements. For example, as shown in FIGS. 7A and 8A, the first axial sleeve member 72 can comprise a high-voltage region 92. In some embodiments, after installation, the stator winding 36 can be coupled to portions of an electrical system of a vehicle (not shown) via the high-voltage region 92. In some embodiments, the first axial sleeve member 72 can comprise at least a portion of the inlets 88 and/or the outlet 90 and the second axial sleeve member 74 can comprise the high-voltage region 92.

In some embodiments, the first and the second axial sleeve members 72, 74 can be further configured after manufacture. In some embodiments, after casting, at least some portions of the first and second axial sleeve members 72, 74 can be further processed to provide for downstream uses of the axial sleeve members 72, 74. For example, in some embodiments, as shown in FIGS. 8A and 8B, edges of the flanges 76, 78, 82, 84 can be processed (e.g., via a conventional machining process) to provide structures that can be used when coupling together the first and second axial sleeve members 72, 74.

As shown in FIGS. 9-16, in some embodiments, at least some of the flanges 76, 78, 82, 84 can comprise at least one coupling flange 100 and/or at least one coupling recess 102. For example, as shown in FIGS. 9-13, in some embodiments, the first and second flanges 76, 78 can comprise coupling flanges 100 and the third and fourth flanges 82, 84 can comprise coupling recesses 102. In some embodiments, after casting, axial edges of the flanges 76, 78, 82, 84 can comprise substantially planar and/or flat surfaces. During machining of the flanges 76, 78, 82, 84, the coupling flanges 100 and coupling recesses 102 can be formed for use in coupling together the first and second axial sleeve members 72, 74. In some embodiments, the coupling flanges 100 can be machined into the third and fourth flanges 82, 84 and the coupling recesses 102 can be machined into the first and second flanges 76, 78. Moreover, in some embodiments, the first axial sleeve member 72 can comprise a flange (e.g., the first flange 76 or the second flange 78) including a coupling recess 102 and a flange (e.g., the first flange 76 or the second flange 78) including a coupling flange 100. The second axial sleeve member 74 can comprise a substantially similar configuration (i.e., one of the third and fourth flanges 82, 84 comprising a coupling flange 100 and the other of the third and fourth flanges 82, 84 comprising a coupling recess 102).

In some embodiments, the coupling flanges 100 and coupling recesses 102 can be configured and arranged for use in coupling together the first and second axial sleeve members 72, 74. For example, in some embodiments, the coupling flanges 100, which extend from the first and second flanges 76, 78 can be dimensioned to be received within the coupling recesses 102 that are defined in the third and fourth flanges 82, 84. In some embodiments, during assembly of the sleeve member 14, the manufacturer can use the coupling flanges 100 and coupling recesses 102 of the flanges 78, 78, 82, 84 to align the first and second axial sleeve members 72, 74 and at least partially retain the axial sleeve members 72, 74 in relation to each other for coupling. For example, in some embodiments, after completion of the machining, the coupling flanges 100 of the first axial sleeve member 72 can be inserted into the coupling recesses 102 of the second axial sleeve member 74 to retain the first and second axial sleeve members 72, 74 in position in relation to each other, as shown in FIGS. 9-13. In some embodiments, once the coupling flanges 100 are at least partially disposed within the coupling recesses 102, the first axial sleeve member 72 and the second axial sleeve member 74 can be coupled together (e.g., via conventional welding, friction welding, riveting, brazing, adhesives, coupling structures, such as screws, bolts, etc.). Moreover, in some embodiments, the interface between the coupling flanges 100 and the coupling recess 102 can comprise at least one of an o-ring, a gasket, or another sealing element (not shown) to create a fluid-tight seal between the first and second axial sleeve members 72, 74.

In some embodiments, first and second axial sleeve members 72, 74 can be processed to comprise other features. As shown in FIGS. 8-10 and 17, in some embodiments, one or more retaining features 104 can be machined into a portion of the inner surface 62 of the sleeve member 14. In some embodiments, the retaining features 104 can be machined prior to coupling together of the first and second axial sleeve members 72, 74, and in other embodiments, the retaining features 104 can be machined into the first and second axial sleeve members 72, 74 prior to coupling. In some embodiments, the retaining features 104 can be configured and arranged to engage similar features (not shown) on the outer perimeter 43 of the stator core 34 to function in retaining the stator core 34 within the housing 12. Moreover, in some embodiments, the retaining features 104 can also function to guide the stator core 34 during assembly of the electric machine module 10 (e.g., the retaining features 104 engage the outer perimeter 43 of the stator core 34 to restrain circumferential movement during assembly).

In some embodiments, at least one of the first and the second axial sleeve members 72, 74 can comprise one or more of the coolant apertures 66. For example, as shown in FIGS. 8A, 9, 10, and 17, in some embodiments, the first axial sleeve member 72 can comprise a plurality of coolant apertures 66. In some embodiments, the first axial sleeve member 72 can comprise the coolant apertures 66 around a portion of a circumference of the inner surface 62. For example, in some embodiments, the coolant apertures 66 can be disposed through some portions of the second flange 78. In some embodiments, the coolant apertures 66 can be machined prior to coupling together of the first and second axial sleeve members 72, 74, and in other embodiments, the coolant apertures 66 can be machined into the first and second axial sleeve members 72, 74 prior to coupling. Moreover, in some embodiments, both the first and the second axial sleeve members 72, 74 can comprise the coolant apertures 66. In some embodiments, the second axial sleeve member 74 can comprise the coolant apertures 66, in lieu of the first axial sleeve member 72 or vice versa.

As previously mentioned and shown in FIGS. 9-13, 17, and 18, in some embodiments, the first and second axial sleeve members 72, 74 can be coupled together to form at least a portion of the housing 12. For example, in some embodiments, after machining, the coupling flanges 100 can be at least partially inserted within the coupling recesses 102 to align the flanges 76, 78, 82, 84 and the axial sleeve members 72, 74 can be coupled together (e.g., via conventional and/or friction welding, brazing, adhesives, etc.). As a result of the coupling of the flanges 76, 78, 82, 84, the first and second recesses 80, 86 can become fluidly coupled. Moreover, once fluidly coupled, the first and second recesses 80, 86 can define the coolant jacket 60, as shown in FIGS. 9-13, 17, and 18. Furthermore, once the first and second axial sleeve members 72, 74 are coupled together to form the sleeve member 14, the stator assembly 26 can be positioned within the sleeve member 14 using at least some of the retaining features 104, the stop region 94, and the thermal flange 96 for guidance in assembly.

In some embodiments, the coolant jacket 60 formed from first and second recesses 80, 86 can comprise a different configuration relative to a conventional coolant jacket 60. In some embodiments, the coolant jacket 60 can comprise a substantially or completely non-uniform radial length. In order to facilitate the casting process, at least some portions of the first and the second axial sleeve members 72, 74 can comprise a drafted configuration (e.g., portions of the first and second axial sleeve members 72, 74 can comprise an angled configuration to enable removal of casting molds used in the casting process). For example, in some embodiments, the flanges 76, 78, 82, 84 can be at least partially angled outward (i.e., radially outward) to enable removal of the casting molds upon completion of the fabrication process. As a result, in some embodiments, when the first and second flanges 76, 78 are coupled to the third and fourth flanges 82, 84, the coolant jacket 60 formed be combining the recesses 80, 86 can comprise a greater radial length at a generally medially axial position (e.g., at the position where the flanges 76, 78, 82, 84 are coupled together) relative to other portions of the coolant jacket 60.

In some embodiments, portions of the housing 12 can comprise a drain system 106. In some embodiments, prior to, or after, coupling together the first and second axial sleeve members 72, 74, the drain system 106 can be disposed through a portion of the inner surface 62 (e.g., portions of the second and fourth flanges 76, 84). For example, as shown in FIG. 18, in some embodiments, the drain system 106 can be positioned in a generally lower portion of the of the sleeve member 14 so that at least a portion of the coolant that enters the machine cavity 22 from the coolant jacket 60 via the coolant apertures 66 can exit the machine cavity 22 by the drain system 106. In some embodiments, the drain system 106 can comprise a substantially similar configuration to some embodiments described in U.S. patent application Ser. No. 13/181,264, which is assigned to the same assignee as the present application and is herein incorporated by reference in its entirety. Briefly, in some embodiments, one or more drain apertures 108 can be disposed through portions of the inner surface 62 (e.g., portions of the second and fourth flanges 76, 84) in circumferential and/or axial directions, as shown in FIG. 18. In some embodiments, the drain apertures 108 can be in fluid communication with the outlet 90. In some embodiments, portions of the coolant jacket 60 immediately adjacent to the drain system 106 can be substantially or completely sealed to enable coolant to enter the drain system 106 and exit the module 10 via the outlet 90. For example, in some embodiments, one or more partitions (not shown) can be disposed within the coolant jacket 60 to segregate coolant flow from the one or more inlets 88 and coolant exiting the machine cavity 22 via the drain system 106 and the outlet 90. As a result, in some embodiments, coolant can enter the machine cavity 22 from the coolant jacket 60 and exit the machine cavity 22 via the drain apertures 108 and the outlet 90.

Furthermore, in some embodiments, the coolant jacket 60 can comprise different configurations. For example, in some embodiments, at least a portion of the coolant entering the coolant jacket 60 can enter from an inlet 88 at an upper portion of the sleeve member 14 and flow in both circumferential directions (i.e., clockwise and counter-clockwise). In some embodiments, coolant can flow in one circumferential direction (e.g., clockwise or counter-clockwise). In other embodiments, the sleeve member 14 can be configured so that coolant enters the coolant jacket 60 at a first axial side and circumferentially flows through at least a portion of the coolant jacket 60 and then passes to the other axial side of the sleeve member 14 and also circumferentially flows through another portion of the coolant jacket 60. In yet other embodiments, coolant flow through the coolant jacket 60 can comprise any other configuration that can be optimized based on thermal transfer needs.

Figure 19A:
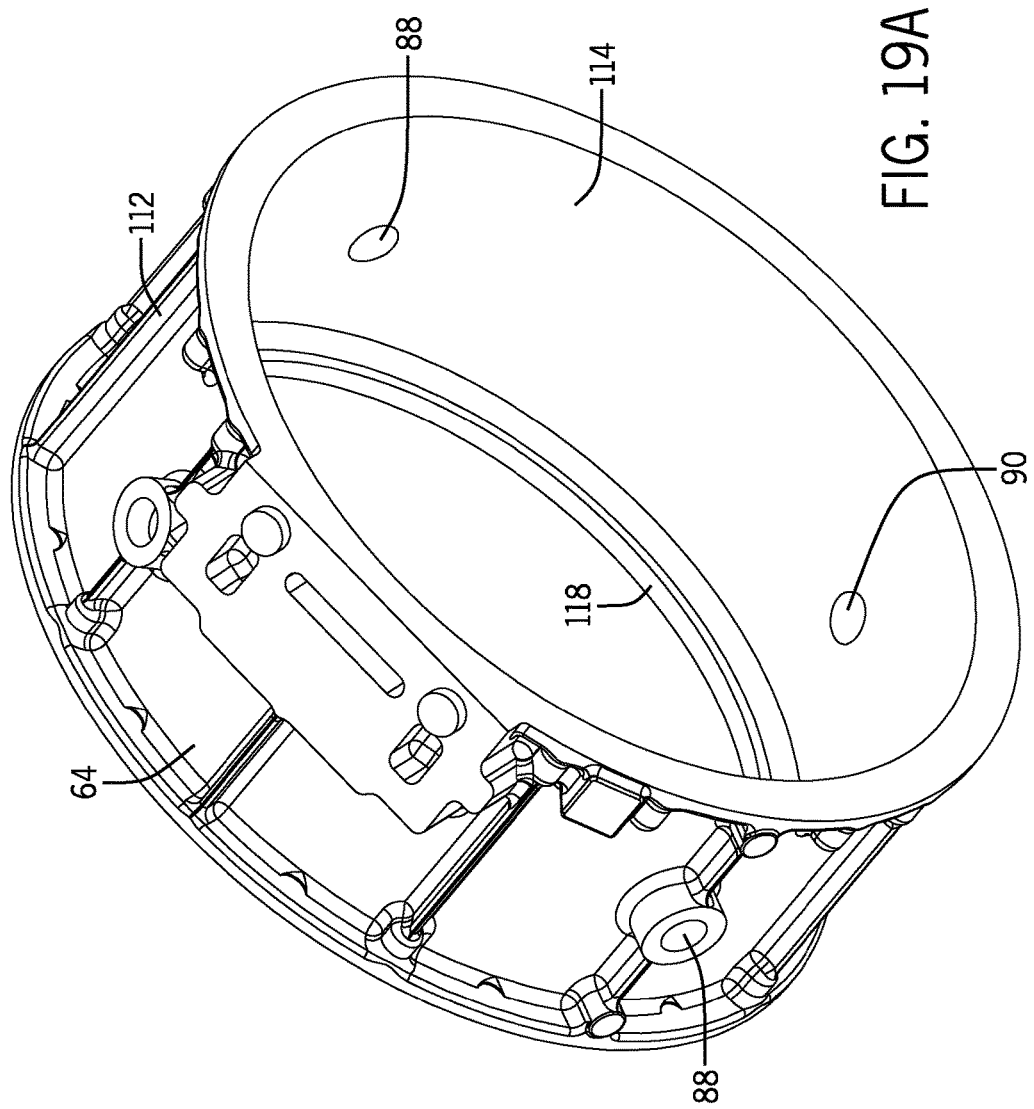
FIG. 19A is a perspective view of an outer sleeve member according to one embodiment of the invention.

In some embodiments, portions of the housing 12 can comprise alternative configurations. As shown in FIGS. 19A and 19B, in some embodiments, the sleeve member 14 can comprise an inner sleeve member 110 and an outer sleeve member 112. In some embodiments, the inner sleeve member 110 can be configured and arranged to be at least partially received within the outer sleeve member 112. For example, in some embodiments, a portion of an inner diameter 114 of the outer sleeve member 112 can comprise a substantially similar size to a portion of an outer diameter 116 of the inner sleeve member 110. For example, in some embodiments, the inner sleeve member 110 can be at least partially disposed within the outer sleeve member 112 to define at least a portion of the coolant jacket 60 therebetween, as described in further detail below.

In some embodiments, at least one of the inner sleeve member 110 and the outer sleeve member 112 can be manufactured in a manner substantially similar to the first and second axial sleeve members 72, 74. In some embodiments, the inner and outer sleeve members 110, 112 can be formed using a casting process. For example, in some embodiments, at least one of the inner and outer sleeve members 110, 112 (e.g., the inner sleeve member 110) can be manufactured using a conventional casting process (e.g., conventional open-and-close casting). Moreover, in some embodiments, at least one of the inner and outer sleeve members 110, 112 (e.g., the outer sleeve member 112) can be formed using other casting processes (e.g., using a four-slide pull and a die-cast). As result of these casting processes, cost and complexity of housing 12 manufacture can be reduced, leading to an improved and more cost-effective product.

Figure 21:
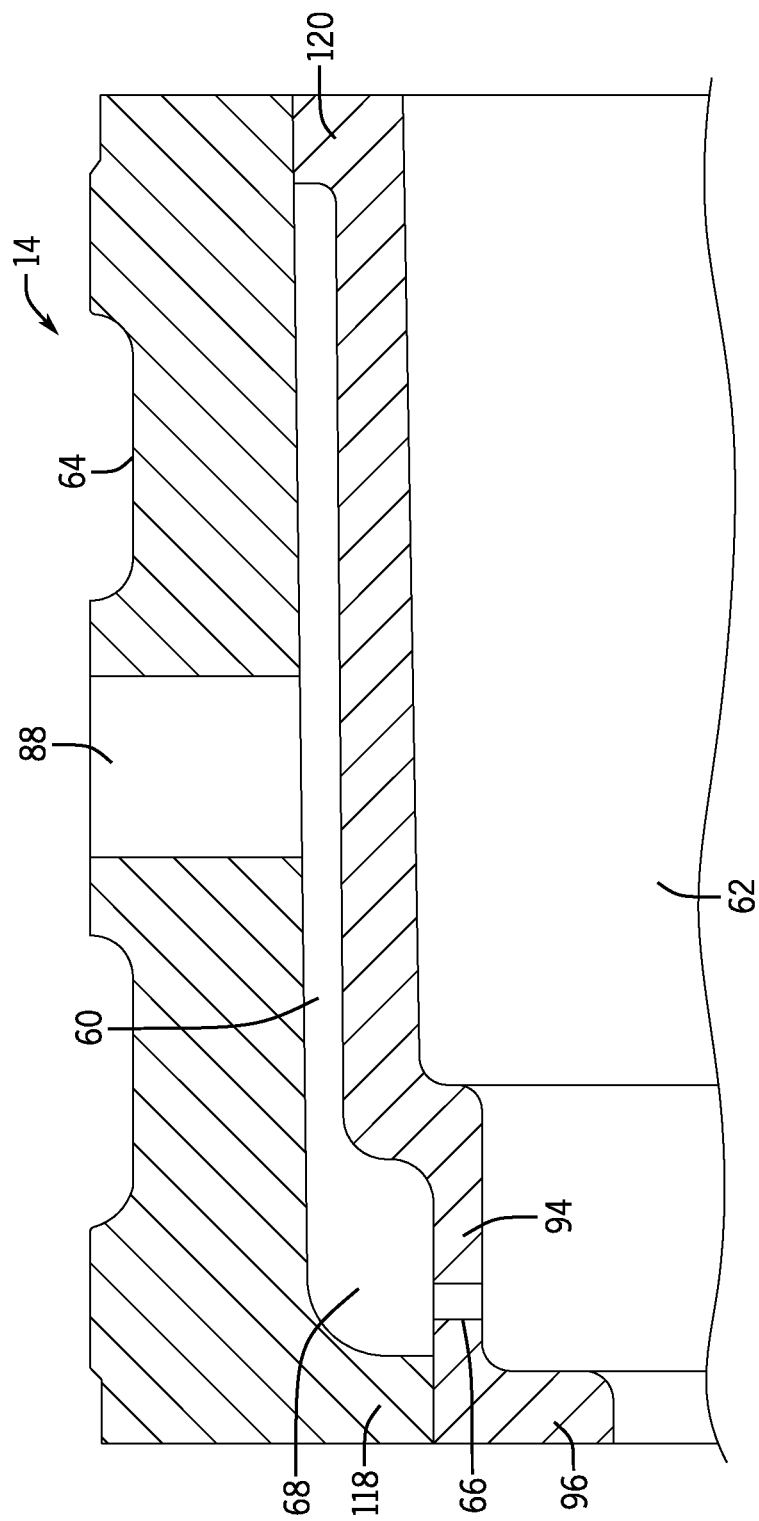
FIG. 21 is a cross-sectional view of a portion of a sleeve member according to one embodiment of the invention.

As shown in FIGS. 19A and 20A, in some embodiments, the outer sleeve member 112 can comprise one or more inlets 88 and one or more outlets 90. For example, similar to the first and second axial sleeve members 72, 74, the outer sleeve member 112 can comprise three inlets 88 and one outlet 90 spaced about ninety degrees apart (e.g., inlets 88 disposed adjacent to the three-o'clock, nine-o'clock, and twelve-o'clock positions and the outlet 90 adjacent to the six-o'clock position). In some embodiments, the outer sleeve member 112 can comprise at least one radially-inward extending flange 118. As shown in FIGS. 19A, 20A, and 21, the inner diameter 114 can comprise a substantially planar configuration with the radially-inward extending flange 118 extending from the inner diameter 114 at an axial end of the outer sleeve member 112.

In some embodiments, the inner sleeve member 110 can comprise a stop region 94 and a thermal flange 96, similar to the first and/or second axial sleeve members 72, 74. In some embodiments, the inner sleeve member 110 can comprise the stop region 94 and the thermal flange 96 at an axial side of the inner sleeve member 110. As shown in FIGS. 19-21, in some embodiments, the stop region 94 can comprise a lesser diameter than a remainder of the inner sleeve member 110. Moreover, in some embodiments, the thermal flange 96 can extend radially inward in a manner substantially similar to the first and/or second axial sleeve members 72, 74. Furthermore, in some embodiments, the stop region 94 and the thermal flange 96 can comprise substantially similar configurations and function as the stop region 94 and the thermal flange 96 in the first and second axial sleeve members 72, 74.

Additionally, as shown in FIGS. 19-21, in some embodiments, the inner sleeve member 110 can comprise at least one radially-outward extending flange 120. For example, in some embodiments, the radially-outward extending flange 120 can be disposed at an axial side of the inner sleeve member 110 that opposes the axial side of the inner sleeve member 110 comprising the stop region 94 and thermal flange 96, as shown in FIGS. 19-21. In some embodiments, the radially-outward extending flange 120 can comprise a greater diameter relative to other portions of the inner sleeve member 110.

Additionally, as shown in FIGS. 20A and 20B, in some embodiments, after manufacture (e.g., casting), the inner and outer sleeve members 110, 112 can be further processes (e.g., machined) to refine some portions and properly dimension these elements for downstream assembly. Furthermore, as shown in FIG. 21, in some embodiments, one or more coolant apertures 66 can be defined through some portions of the inner sleeve member 110. As discussed in further detail below, in some embodiments, the coolant apertures 66 can fluidly couple the coolant jacket 60 defined between the inner and outer sleeve members 110, 112 and the machine cavity 22.

Figure 22:
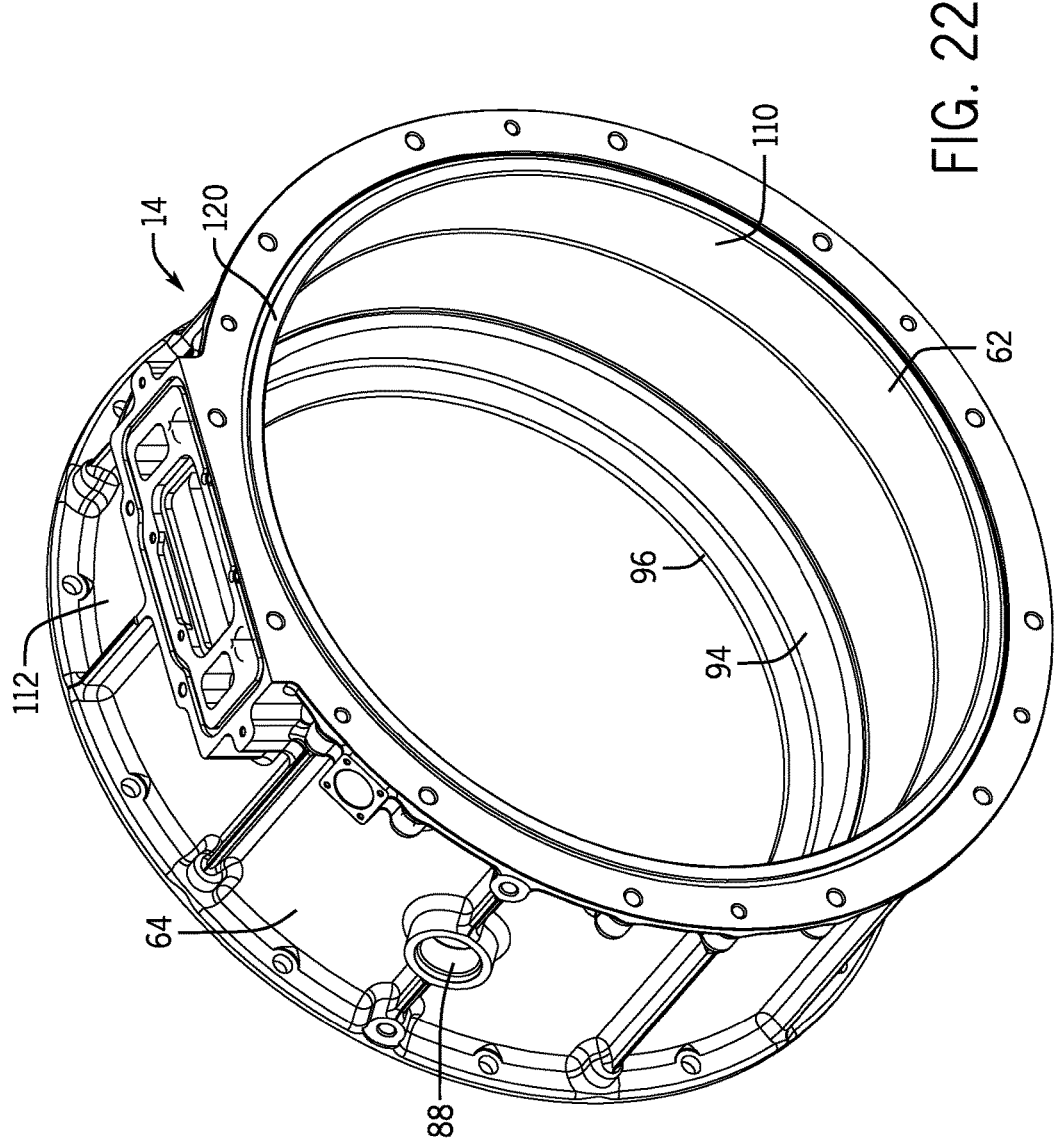
FIG. 22 is a perspective view of a portion of a sleeve member according to one embodiment of the invention.

In some embodiments, the inner sleeve member 110 can be coupled to the outer sleeve member 112. For example, as shown in FIG. 21, in some embodiments, portions of the inner sleeve member 110 can be coupled to portions of the outer sleeve member 112 using at least one of conventional welding, friction welding, brazing, adhesives, conventional fasteners, etc. As result of the coupling, the inner and outer sleeve members 110, 112 can form at least a portion of the sleeve member 14, as shown in FIG. 22.

As shown in FIG. 21, in some embodiments, the coolant jacket 60 can be at least partially defined between the inner and outer sleeve members 110, 112. Referring to FIG. 21, in some embodiments, the coolant jacket 60 can be at least partially defined by portions of the outer diameter 116 of the inner sleeve member 110, the inner diameter 114 of the outer sleeve member 116, the radially-inward extending flange 118, the radially-outward extending flange 120, and the stop region 94. For example, in some embodiments, the radially-inward extending flange 118 and the radially-outward extending flange 120 can form axial portions of the coolant jacket 60.

Additionally, in some embodiments, the coolant jacket 60 can comprise at least one radial extension 68, as shown in FIG. 21, which can be substantially similar to some previously mentioned embodiments. Moreover, in some embodiments, the radial extension 68 can be at least partially formed by the stop region 94 of the inner sleeve member 110, as shown in FIG. 21. For example, as previously mentioned, the radial extension 68 can be disposed radially adjacent to the stator end turns 28 (e.g., more adjacent to the stator end turns 28 relative to some conventional coolant jackets 60), which can lead to improved cooling relative to conventional, substantially uniform coolant jackets 60. In some embodiments, as previously mentioned, the radial extension 68 can comprise a greater radial length relative to other portions of the coolant jacket 60. As a result of this greater radial length, the radial extension 68 can comprise a greater volume of coolant, which, in some embodiments, can improve thermal transfer from the operating electric machine 20 to the coolant and out of the module 10. Accordingly, in some embodiments, after coupling of the inner and outer sleeve members 110, 112 to form the sleeve member 14 and assembly of the module 10, coolant can enter the coolant jacket 60 and the radial extension 68 via one or more inlets 88 disposed through the outer sleeve member 112 and circulate through at least a portion of the coolant jacket 60 and radial extension 68 for receiving thermal energy rejected by the electric machine 20. Moreover, in some embodiments, one or more coolant apertures 66 can be defined through the inner sleeve member 110 to fluidly couple the coolant jacket 60 and the radial extension 68 with the machine cavity 22 so that at least a portion of the coolant can contact some portions of the electric machine 20.

Additionally, in some embodiments, any one of the flanges 76, 78, 82, 84, 96, 118, and 120 and the stop region 94 can comprise any shape. Although depict as substantially or completely circular, any of these and any other elements can comprise non-circular configurations (e.g., square, elliptical, regular or non-regular polygonal, etc.). Accordingly, the circular configuration depicted in the figures is only intended as an exemplary embodiment.

Figure 23:
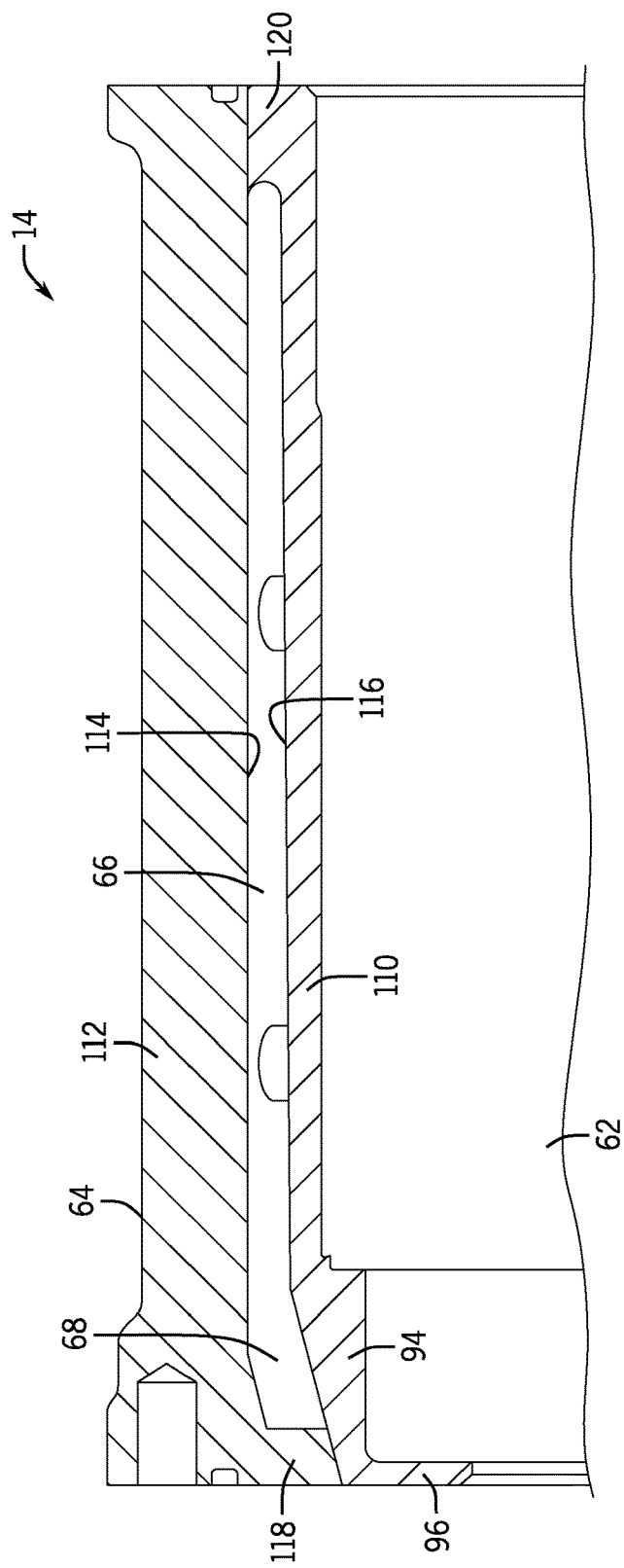
FIG. 23 is a cross-sectional view of a portion of a sleeve member according to one embodiment of the invention.

In some embodiments, the coolant jacket 60 can comprise alternative configurations. For example, as shown in FIG. 23, in some embodiments, the radial extension 68 can comprise an alternative configuration. In some embodiments, the inner diameter 114 of the outer sleeve member 112 and the outer diameter 116 of the inner sleeve member 110 can be configured and arranged so that when these elements are coupled together, a radial extension 68 comprising a substantially similar radial length as a remainder of the coolant jacket 60 is formed. In some embodiments, a radial extension 68 comprising a radial length substantially similar to the remainder of the coolant jacket 60 can reduce and/or eliminate a pressure drop in the coolant flow path that can be created as a result of including a radial extension 68 with a radial length greater than a remainder of the coolant jacket 60. As a result, coolant flow and thermal transfer from the operating electric machine 20 to the coolant can be at least partially improved.

Figure 24A:
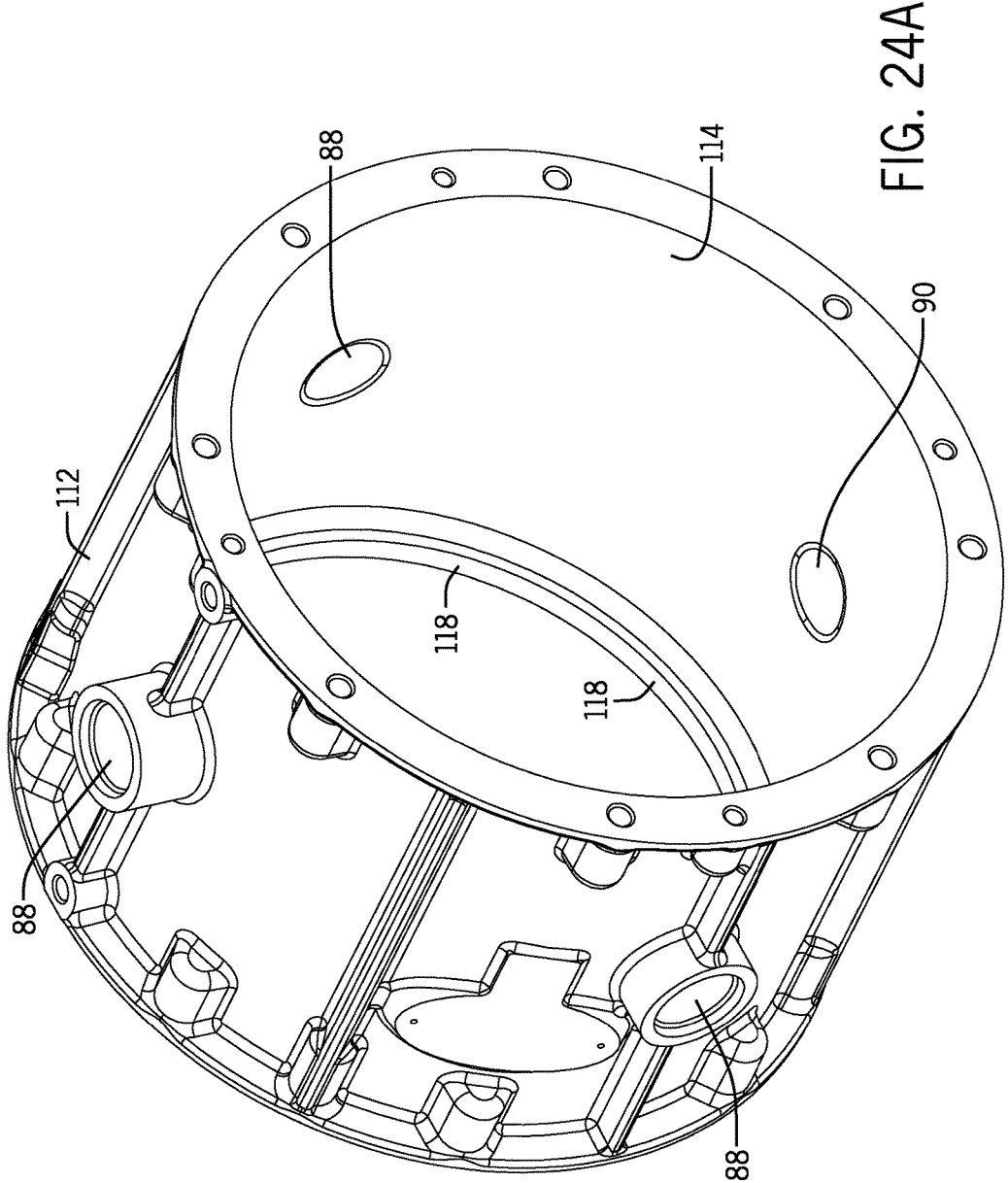
FIG. 24A is a perspective view of an outer sleeve member according to one embodiment of the invention.
Figure 24B:
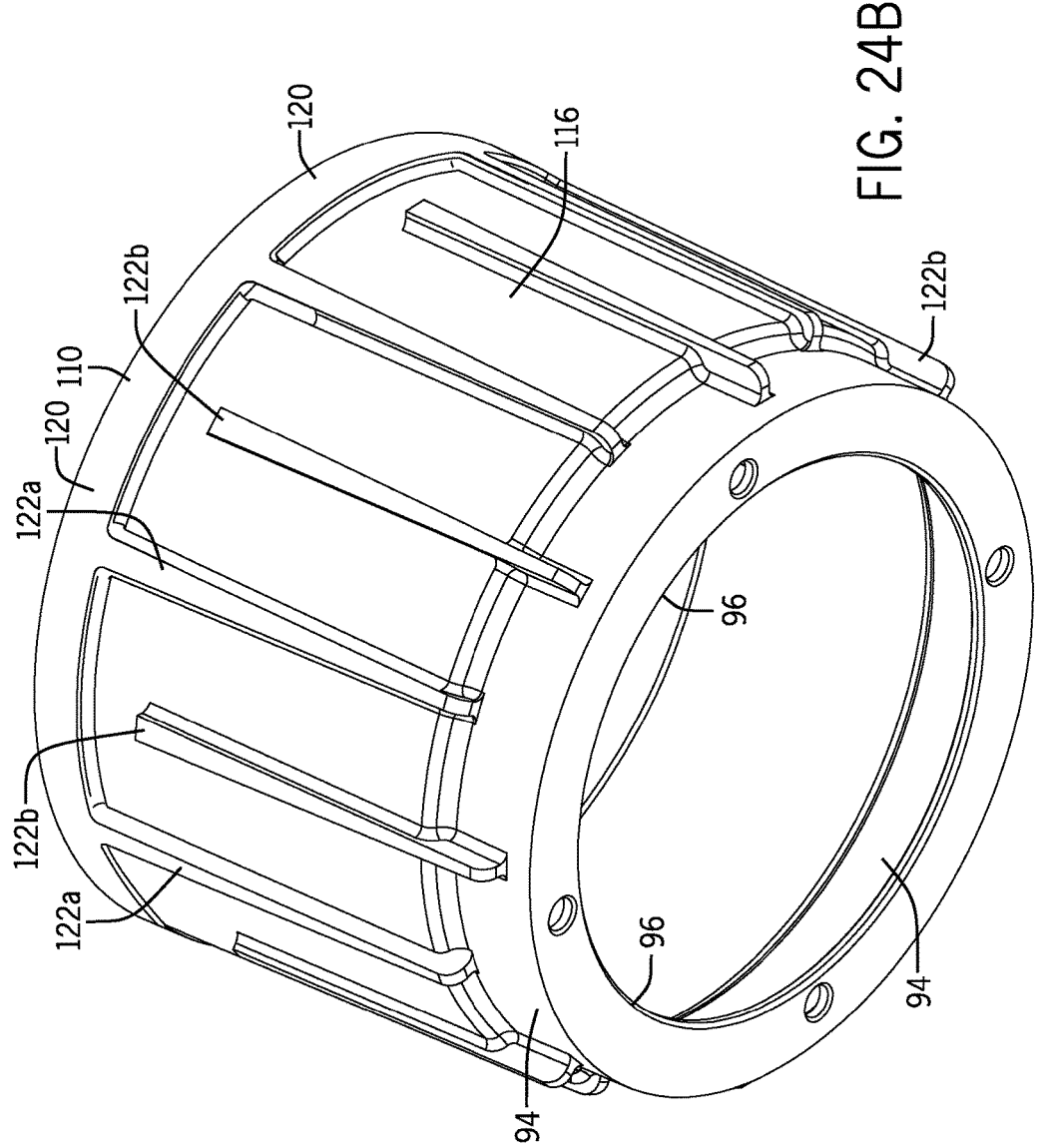
FIG. 24B is a perspective view of an inner sleeve member according to one embodiment of the invention.

In some embodiments, at least one of the inner and outer sleeve members 110, 112 can comprise alternative configurations, as shown in FIGS. 24A and 24B. For example, in some embodiments, the inner sleeve member 110 can comprise one or more flow members 122 extending from the outer diameter 116 (i.e., an outer surface of the inner sleeve member 110), as shown in FIG. 24B. Moreover, in some embodiments, as shown in FIG. 24, the flow members 122 can be arranged around some or all of a circumference of the inner sleeve member 110.

Figure 25:
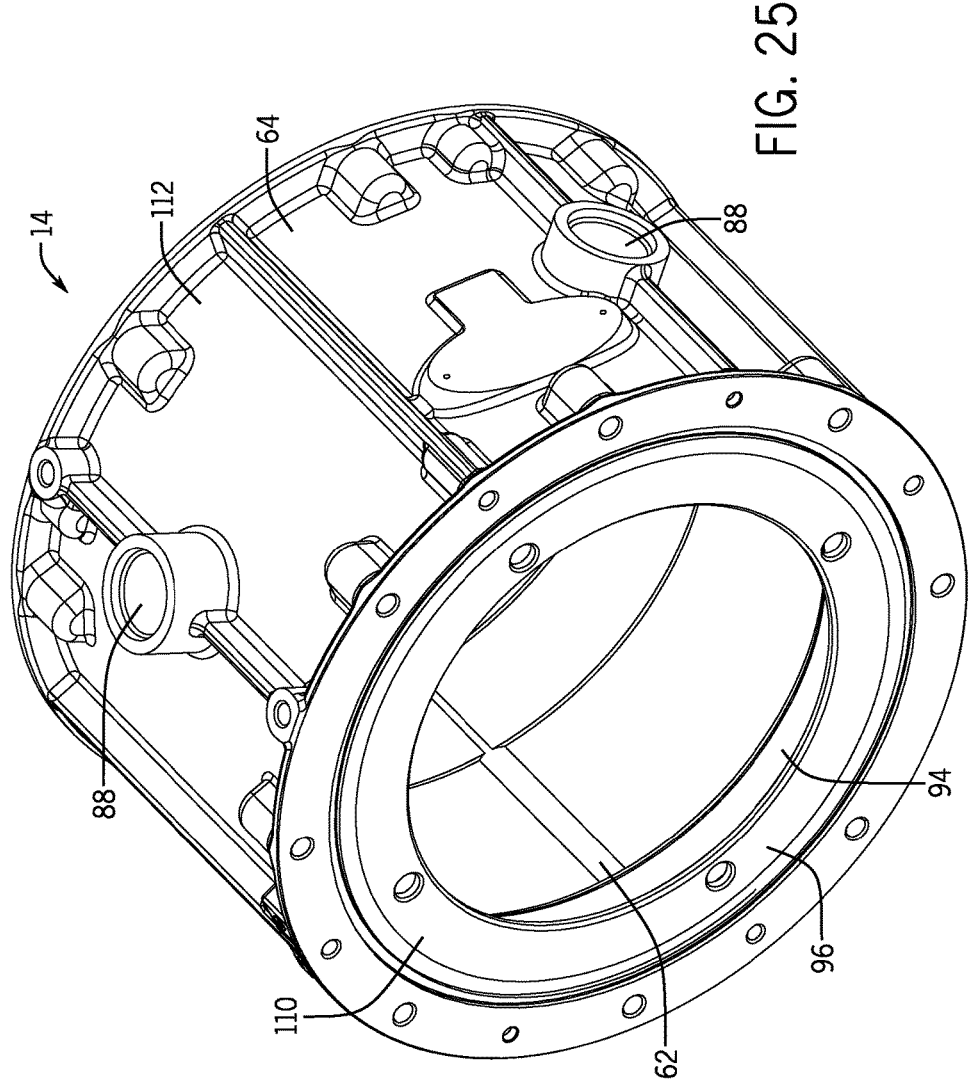
FIG. 25 is a perspective view of a sleeve member according to one embodiment of the invention.
Figure 26:
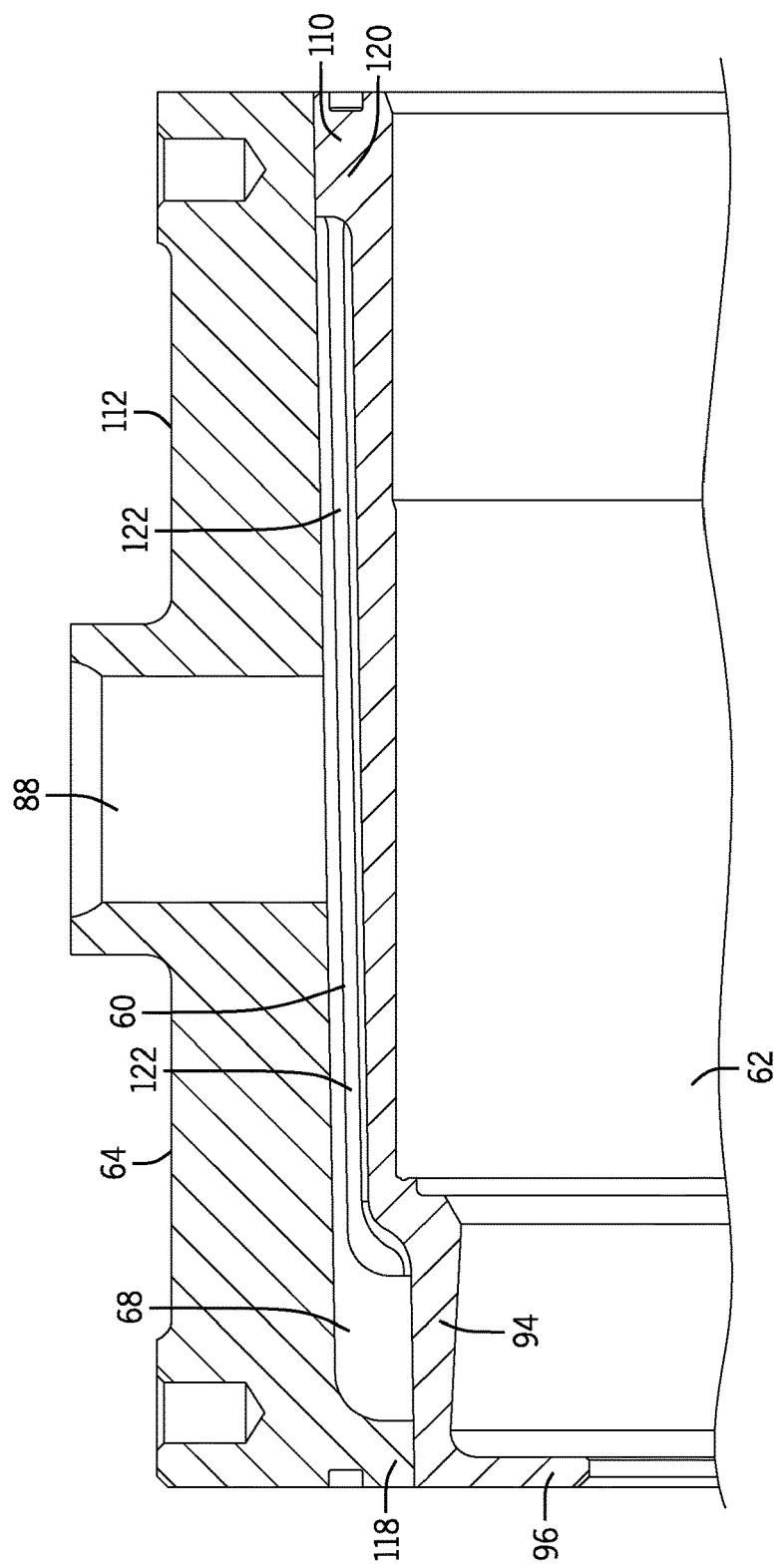
FIG. 26 is a cross-sectional view of a portion of a sleeve member according to one embodiment of the invention.

In some embodiments, the flow members 122 can comprise a radial length substantially similar to a radial length of the radially-outward extending flange 120. For example, in some embodiments, at least a portion of the flow members 122 can be substantially or completely integral with the radially-outward extending flange 120 and extend a portion of an axial length of the inner sleeve member 110. Furthermore, as shown in FIG. 24B, in some embodiments, some of the flow members 122 can be disposed in a pattern. For example, in some embodiments, a first portion of the flow members 122a (e.g., about one half of the flow members 122) can be integral and/or coupled to the radially-outward extending flange 120 and extend toward the stop region 94 and another portion of the flow members 122b can be positioned more axially central with respect to the axial length of the inner sleeve member 110, as shown in FIG. 24B. By way of example only, in some embodiments, the first and second portions of the flow members 122a, 122b can be axially offset with respect to each other and alternatingly arranged around the circumference of the inner sleeve member 110, as shown in FIG. 24B. Also, in some embodiments, the flow members 122 can be formed during the manufacturing process (e.g., casting), and in other embodiments, after the casting process is complete, the flow members 122 can be machined into the inner sleeve member 110. In some embodiments, the inner sleeve member 110 comprising the flow members 122 can be coupled to the outer sleeve member 112 to form the sleeve member 14, as shown in FIGS. 25 and 26. For example, in some embodiments, as discussed in further detail below, the flow members 122 can comprise a radial length substantially similar to a radial length of at least some portions of the coolant jacket 60. As a result, in some embodiments, the flow members 122 can seal portions of the coolant jacket 60 and/or impede coolant flow to aid in cooling of the electric machine module 10.

Figure 27:
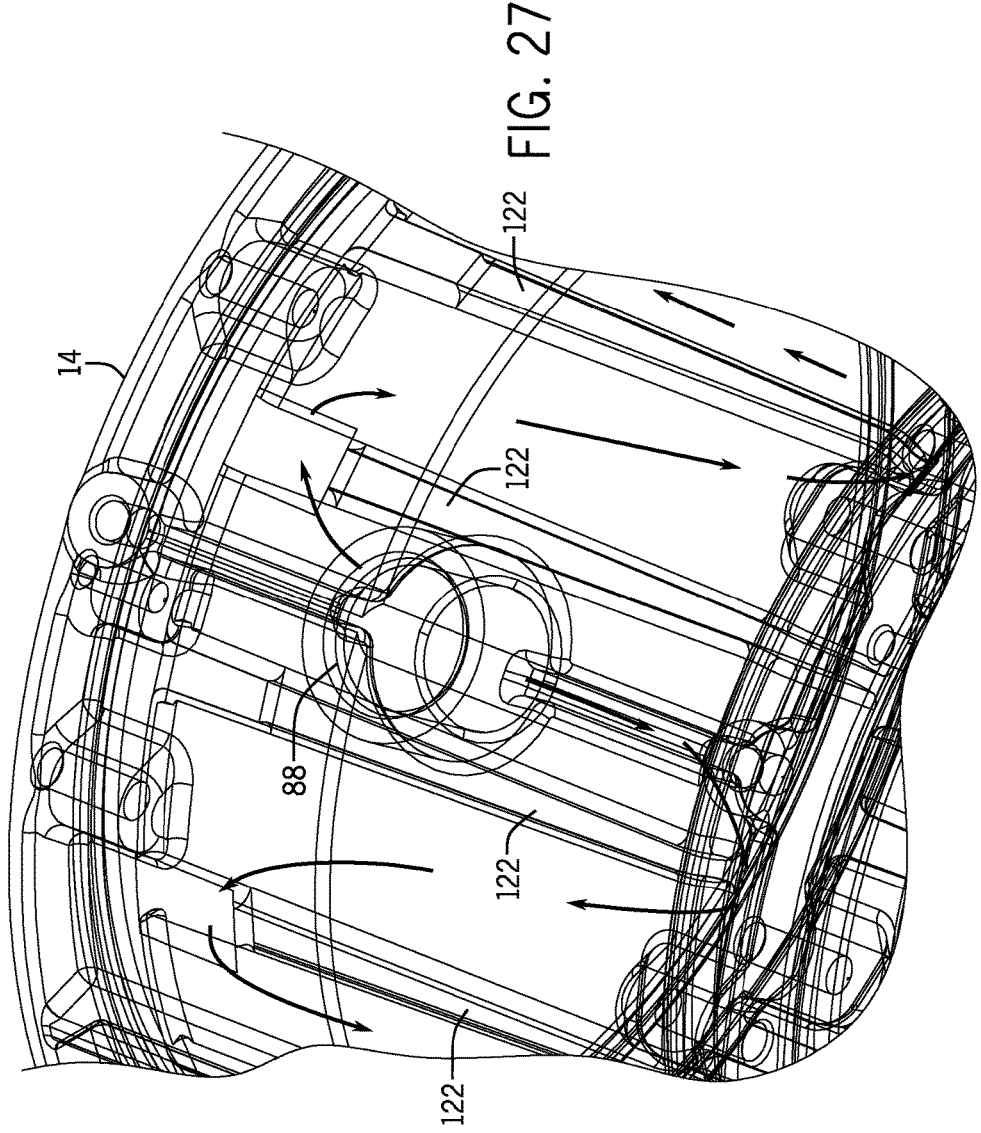
FIG. 27 is a diagram of a sleeve member comprising an "S-Shaped" coolant flow path according to one embodiment of the invention.

In some embodiments, the flow members 122 can be configured and arranged to provide a coolant flow path. For example, as shown by the arrows in FIG. 27, in some embodiments, the flow members 122 can be arranged to provide an "S-shaped" coolant flow pattern. As previously mentioned, in some embodiments, the flow members 122 can be axially offset with respect to each other around the circumference of a portion of the inner sleeve member 110. As a result, coolant can flow around portions of the offset flow members 122 so that the coolant moves in both axial and circumferential directions within portions of the coolant jacket 60. In some embodiments, this multi-directional flow can increase turbulence of the coolant flow, which can result in increased thermal transfer from the inner sleeve member 110 to the coolant. Additionally, in some embodiments, the flow members 122 can provide additional surface area to transfer thermal energy from the electric machine 20 and housing 12 to the coolant, which can further enhance module 10 cooling. In some embodiments, the first and/or the second axial sleeve members 72, 74 can comprise one or more flow members 122 (not shown). For example, similar to the inner sleeve member 110 and the outer sleeve member 112, the flow members 122 in the first and second axial sleeve members 72, 74 can enable different coolant flow patterns through the coolant jacket 66 (e.g., an S-shaped flow pattern, a flow pattern where coolant flows in axial and circumferential directions, etc.)

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   a housing at least partially defining a machine cavity, the housing further including a sleeve member coupled to at least one end cap, the sleeve member comprising;
   an outer sleeve member including a radially-inward extending flange, and
   an inner sleeve member including a radially-outward extending flange, a thermal flange, and a stop region, the outer sleeve member being coupled to the inner sleeve member so that at least one coolant jacket is defined between the outer sleeve member and the inner sleeve member, the at least one coolant jacket configured and arranged to house a coolant; and
   wherein the coolant jacket comprises at least one radial extension configured and arranged to include at least a portion of the coolant as a radially extending volume of fluid within the at least one radial extension; and
   an electric machine being positioned substantially within the machine cavity and being at least partially enclosed by the housing, the electric machine including a stator assembly comprising stator end turns, the electric machine positioned within the machine cavity so that at least a portion of the stator end turns is adjacent to the radial extension and wherein the radial extension terminates at or before that axial length of the stator end turns;
   wherein the at least one coolant jacket is configured and arranged to house a coolant that extends axially fluidly uninterrupted across at least the axial length of the stator and at least a partial axial length of at least one of the stator end turns.

2. The electric machine module of claim 1 and further comprising at least one inlet being disposed through a portion of the outer sleeve member.

3. The electric machine module of claim 1 and further comprising at least one outlet being disposed through a portion of the outer sleeve member.

4. The electric machine module of claim 1 and further comprising at least one coolant aperture being disposed though a portion of the inner sleeve member so that the coolant jacket is in fluid communication with the machine cavity.

5. The electric machine module of claim 1, wherein the stator assembly comprises a stator core.

6. The electric machine module of claim 5, wherein the stop region is configured and arranged to engage a portion of the stator core.

7. The electric machine module of claim 1, wherein the inner sleeve member is coupled to the outer sleeve member using at least one of welding and brazing.

8. The electric machine module of claim 1 and further comprising a plurality of flow members extending from an outer surface of the inner sleeve member.

9. The electric machine module of claim 8, wherein the plurality of flow members are configured and arranged to guide the coolant through the coolant jacket in axial and circumferential directions.

10. The electric machine module of claim 1, wherein the radial extension of the coolant jacket does not extend axially to the thermal flange.

11. The electric machine module of claim 1, wherein the radial extension of the coolant jacket comprises a radial length about equal to the coolant jacket proximate the radial extension.

12. An electric machine module as set forth in claim 1 further comprising a first end cap extending radially over the inner sleeve member and the outer sleeve member below the stator end turns, and wherein the cooling jacket terminates in the inner sleeve and outer sleeve.

13. An electric machine module comprising:
a housing at least partially defining a machine cavity, the housing further including a sleeve member coupled to at least one end cap, the sleeve member comprising;
an outer sleeve member including a radially-inward extending flange, and
an inner sleeve member including a radially-outward extending flange, a thermal flange, and a stop region, the outer sleeve member being coupled to the inner sleeve member so that at least one coolant jacket is defined between the outer sleeve member and the inner sleeve member, the at least one coolant jacket configured and arranged to house a coolant; and
wherein the coolant jacket comprises at least one radial extension configured and arranged to include at least a portion of the coolant as a radially extending volume of fluid within the at least one radial extension; and
an electric machine being positioned substantially within the machine cavity and being at least partially enclosed by the housing, the electric machine including a stator assembly comprising stator end turns, the electric machine positioned within the machine cavity so that at least a portion of the stator end turns is adjacent to the radial extension and wherein the radial extension terminates at or before that axial length of the stator end turns;
wherein the at least one coolant jacket is configured and arranged to house a coolant that extends axially fluidly uninterrupted across at least the axial length of the stator and at least a partial axial length of at least one of the stator end turns,
and wherein the thermal flange extends below the stator end turns and extends radially inward.

14. An electric machine module comprising:
a housing at least partially defining a machine cavity, the housing further including a sleeve member coupled to at least one end cap, the sleeve member comprising;
an outer sleeve member and an inner sleeve member, the outer sleeve member being coupled to the inner sleeve member so that at least one coolant jacket is defined between the outer sleeve member and the inner sleeve member, the at least one coolant jacket configured and arranged to house a coolant;
an electric machine being positioned substantially within the machine cavity and being at least partially enclosed by the housing, the electric machine including a stator assembly comprising stator end turns, the electric machine positioned within the machine cavity so that at least a portion of the stator end turns is adjacent to the radial extension;
wherein the coolant jacket comprises at least one radial extension configured and arranged to include at least a portion of the coolant as a radially extending volume of fluid adjacent the stator end turns and wherein the radial extension terminates at or before that axial length of the stator end turns.

15. An electric machine module as set forth in claim 14 wherein the inner sleeve member includes a radially-outward extending flange, a thermal flange, and a stop region.

* * * * *